Oct. 31, 1944.  A. F. POTT  2,361,707
CONTROLLING MECHANISM FOR ACCOUNTING MACHINES
Filed Oct. 25, 1939  15 Sheets-Sheet 1

Inventor,
A. F. Pott
By: Glascock Downing & Seebold
Attys.

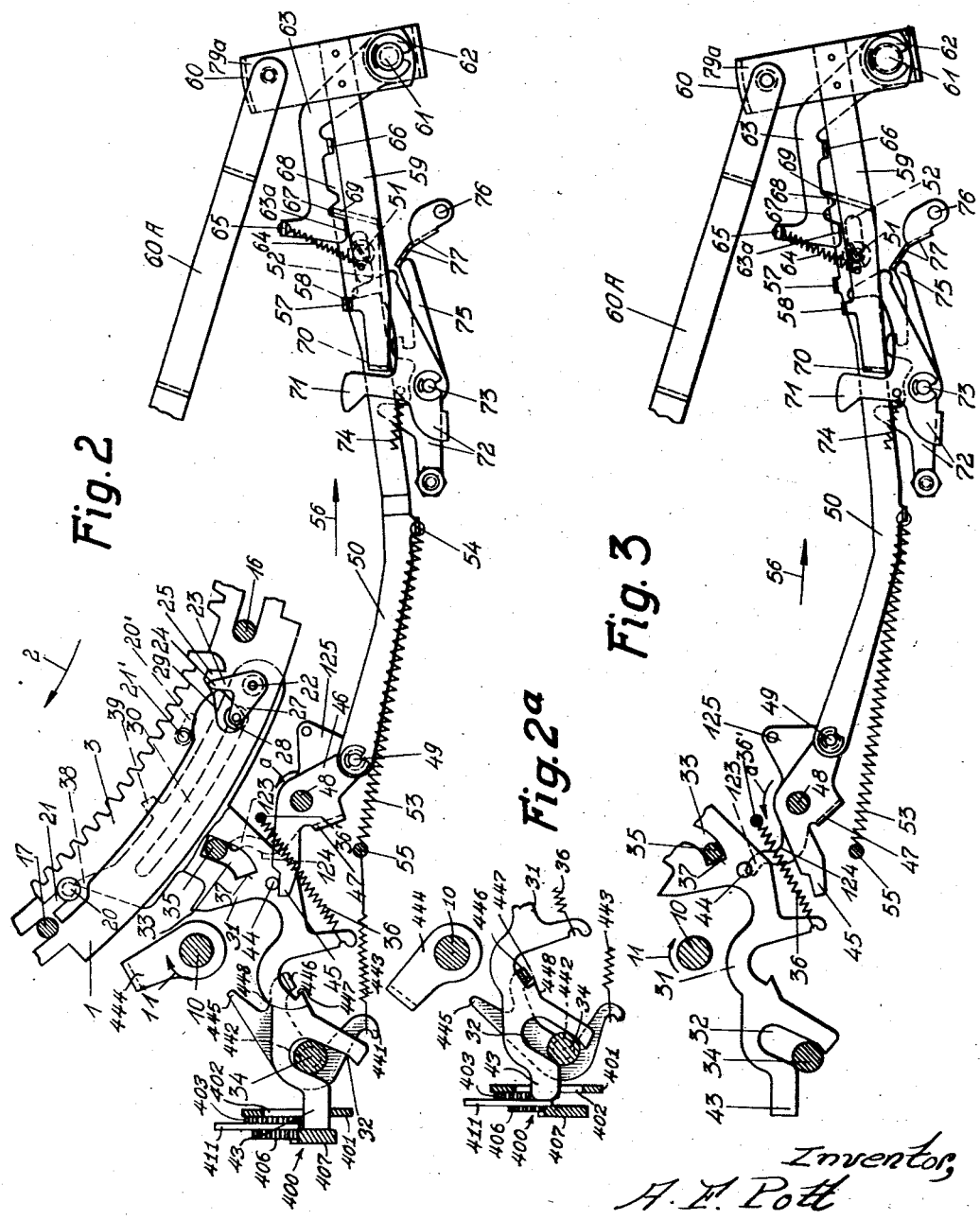

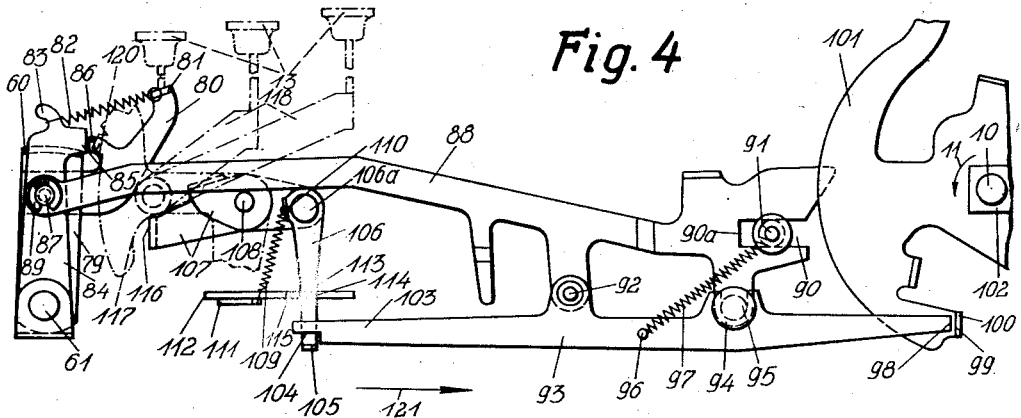
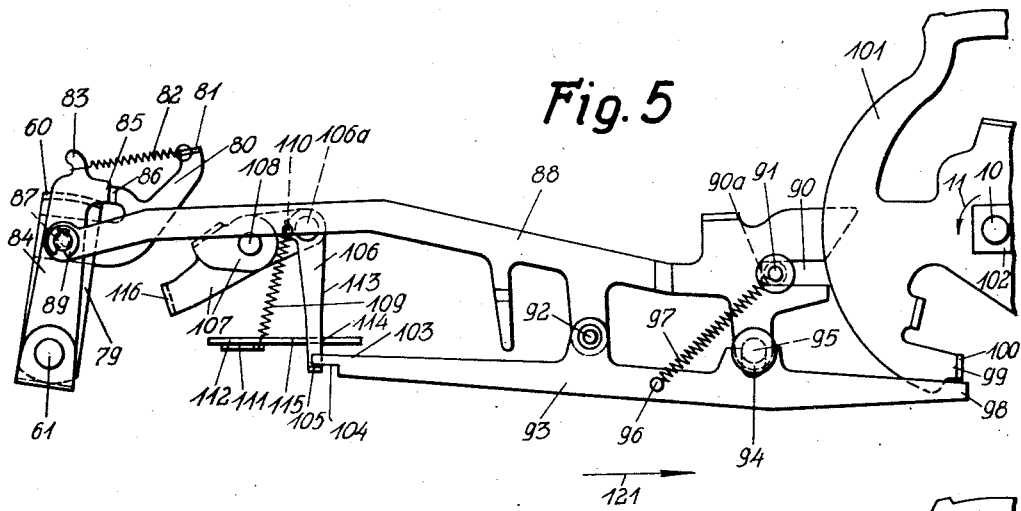
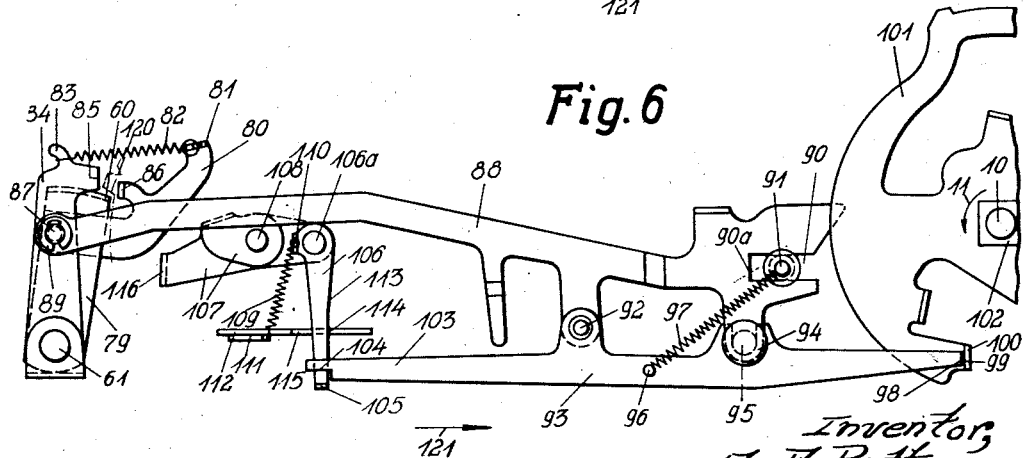

Oct. 31, 1944.　　　A. F. POTT　　　2,361,707
CONTROLLING MECHANISM FOR ACCOUNTING MACHINES
Filed Oct. 25, 1939　　　15 Sheets-Sheet 4

Fig. 7

Inventor
A. F. Pott
By: Glascock Downing & Seebold
Attys.

Oct. 31, 1944.   A. F. POTT   2,361,707
CONTROLLING MECHANISM FOR ACCOUNTING MACHINES
Filed Oct. 25, 1939    15 Sheets-Sheet 5

Oct. 31, 1944. A. F. POTT 2,361,707
CONTROLLING MECHANISM FOR ACCOUNTING MACHINES
Filed Oct. 25, 1939 15 Sheets-Sheet 6

Inventor,
A. F. Pott
By Glascock Downing & Seebold
Attys.

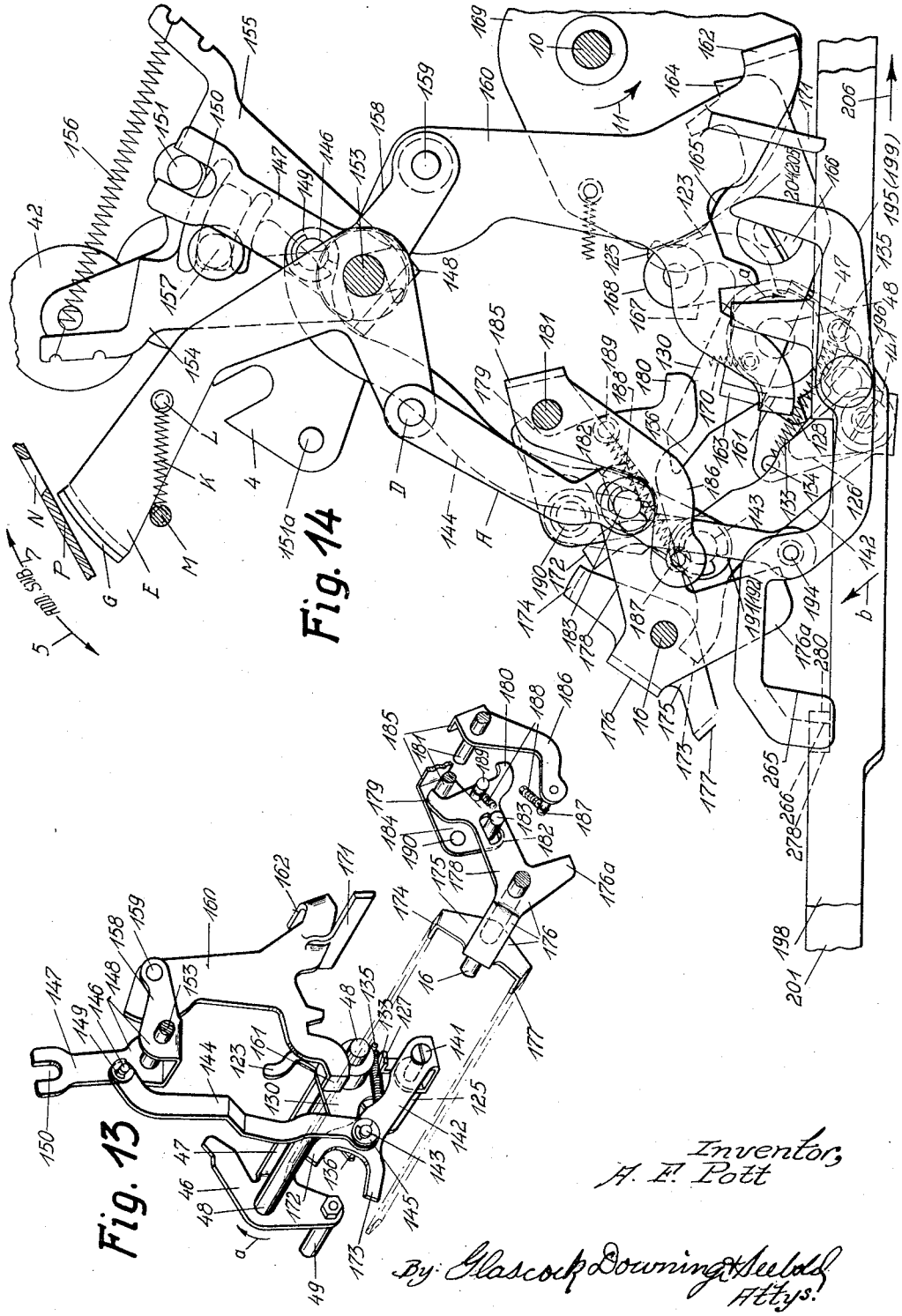

Oct. 31, 1944.　　　　A. F. POTT　　　　2,361,707
CONTROLLING MECHANISM FOR ACCOUNTING MACHINES
Filed Oct. 25, 1939　　　15 Sheets-Sheet 9
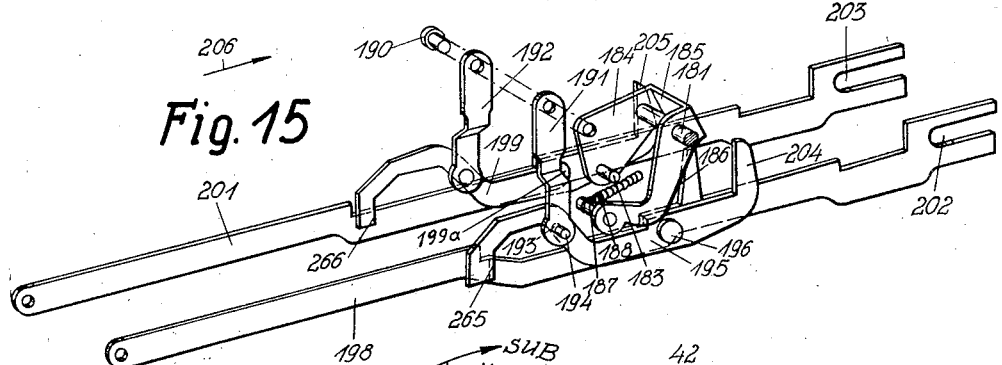
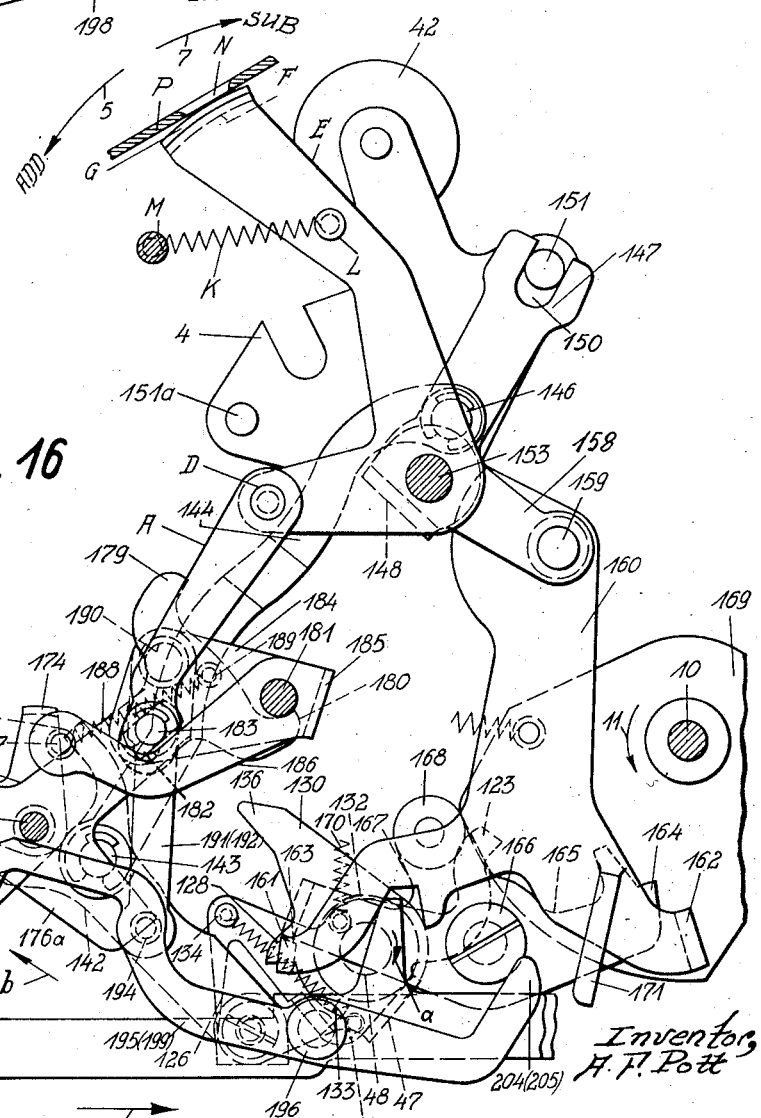
Inventor,
A. F. Pott
by Glascock Downing & Seebold
Attys.

Oct. 31, 1944.　　　　　A. F. POTT　　　　　2,361,707
CONTROLLING MECHANISM FOR ACCOUNTING MACHINES
Filed Oct. 25, 1939　　　15 Sheets-Sheet 10

Inventor,
A. F. Pott
By Glascock
Downing &
Seebold Attys

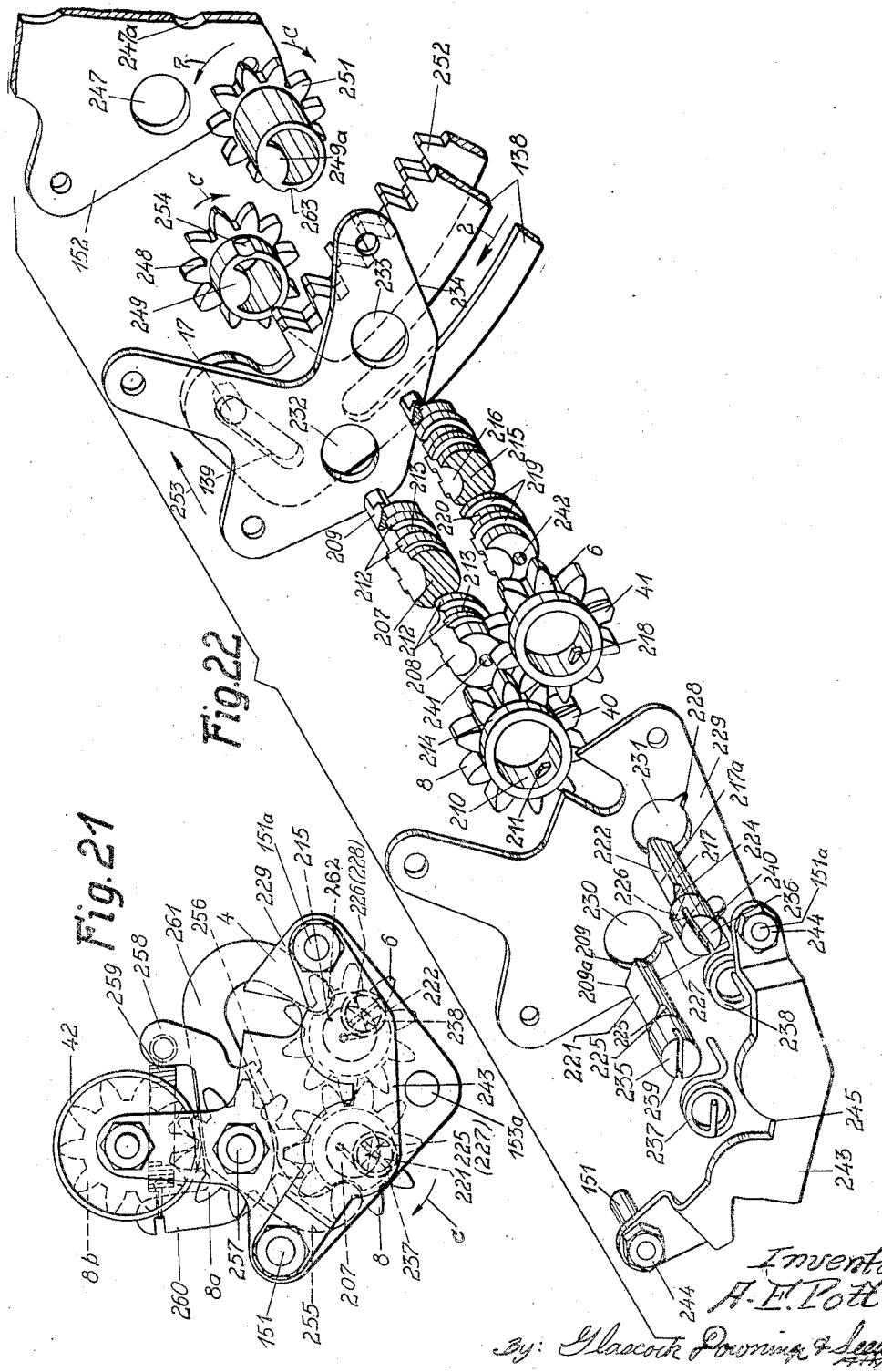

Oct. 31, 1944. A. F. POTT 2,361,707
CONTROLLING MECHANISM FOR ACCOUNTING MACHINES
Filed Oct. 25, 1939 15 Sheets-Sheet 14
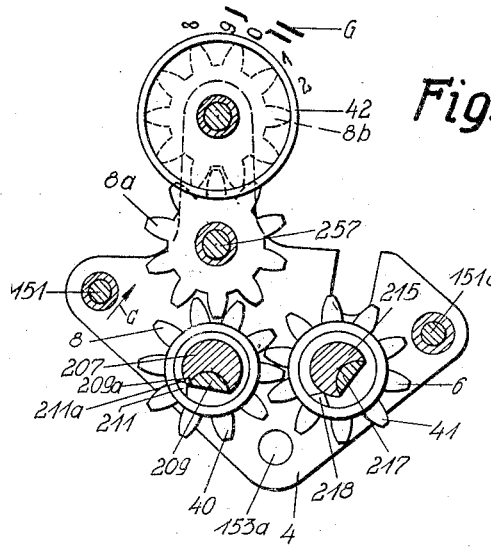
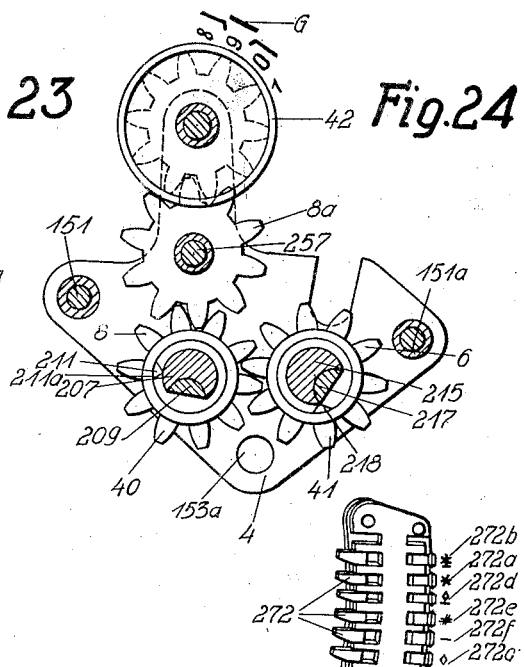
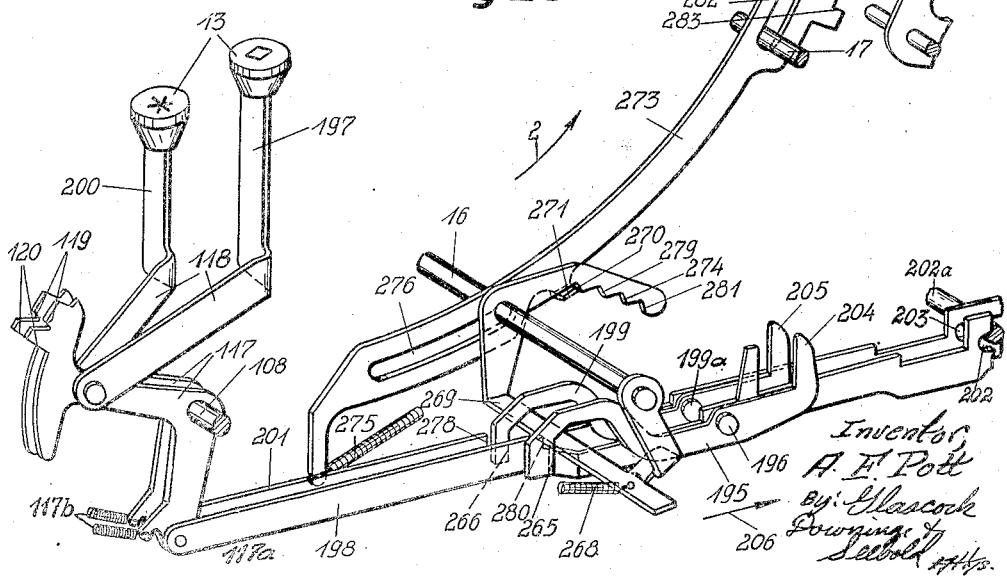

Oct. 31, 1944.  A. F. POTT  2,361,707
CONTROLLING MECHANISM FOR ACCOUNTING MACHINES
Filed Oct. 25, 1939  15 Sheets-Sheet 15
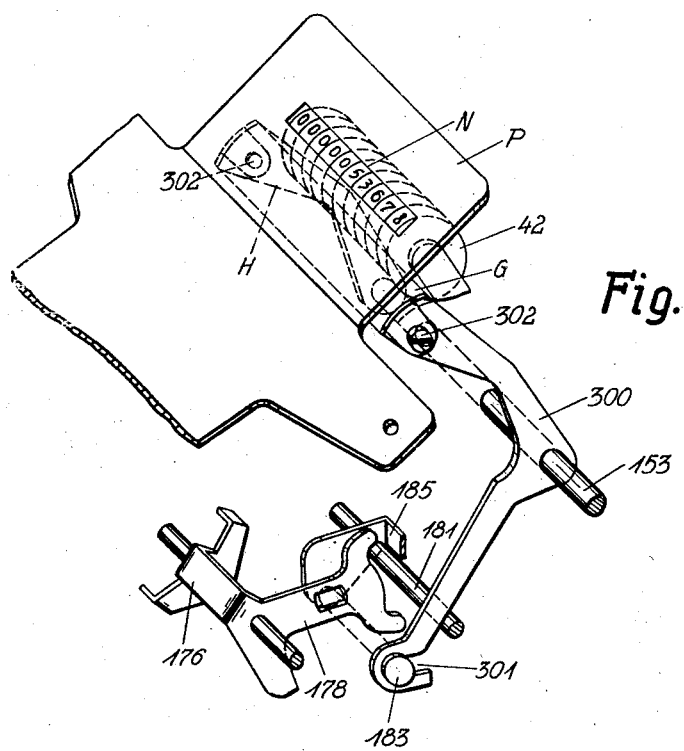
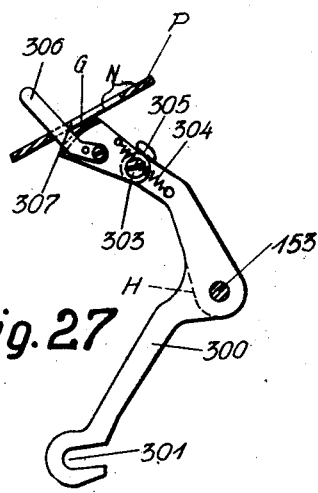
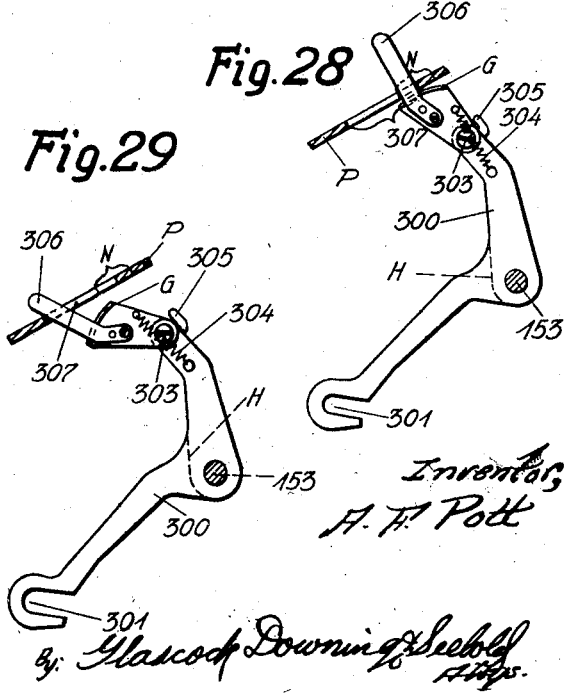
Inventor,
A. F. Pott
By Glascock Downing & Seebold
Attys.

Patented Oct. 31, 1944

2,361,707

UNITED STATES PATENT OFFICE 2,361,707

CONTROLLING MECHANISM FOR ACCOUNTING MACHINES

August Friedrich Pott, Zella-Mehlis, Germany; vested in the Alien Property Custodian Application October 25, 1939, Serial No. 301,289
In Germany November 7, 1938

3 Claims. (Cl. 235—60)

The invention relates to a controlling mechanism for accounting machines which is especially suitable for, but not limited to, adding machines equipped with a printing mechanism for bookkeeping accounts.

Controlling mechanisms for such machines have already become known but are all more or less complicated.

This drawback is eliminated according to the invention by arranging the controlling mechanism to be operated automatically under control of the species of calculation and of a tens-shift member allotted to the denominational wheel of highest order, when the capacity of the totalizer is exceeded to supply the fugitive one. This operation is performed in such manner that the controlling mechanism locks the keys and releases the drive of the machine for another cycle for introducing the fugitive 1 and for preparing the control for total or subtotal taking, with corresponding printing of symbols, for a negative value in positive form, or for a positive value.

In the drawings,

Fig. 2 is a detail view, showing certain parts of the control mechanism illustrated in Fig. 1 in the positions they occupy during the operation of the carrying mechanism or tens transfer of the highest order of the totalizer.

Fig. 2a is a detailed view showing the latch mechanism for the tens shift member in effective position.

Fig. 3 is a detail view showing the parts of the control mechanism illustrated in Fig. 2 in the positions they occupy after the introduction of the fugitive 1.

Fig. 4 is an elevation, viewed from the right and showing the means for locking the operation keys of the machine in their initial positions.

Fig. 5 shows the positions the parts occupy upon depression of an operation key.

Fig. 6 shows the positions the parts occupy when the driving shaft of the machine has returned to its initial position after a partial rotation through 90 degrees.

Fig. 7 is a perspective illustration viewed from the left and the front of the machine and showing the means for locking the number and operation keys of the machine, some parts being shown at a distance from each other for the sake of clearness.

Figure 8:
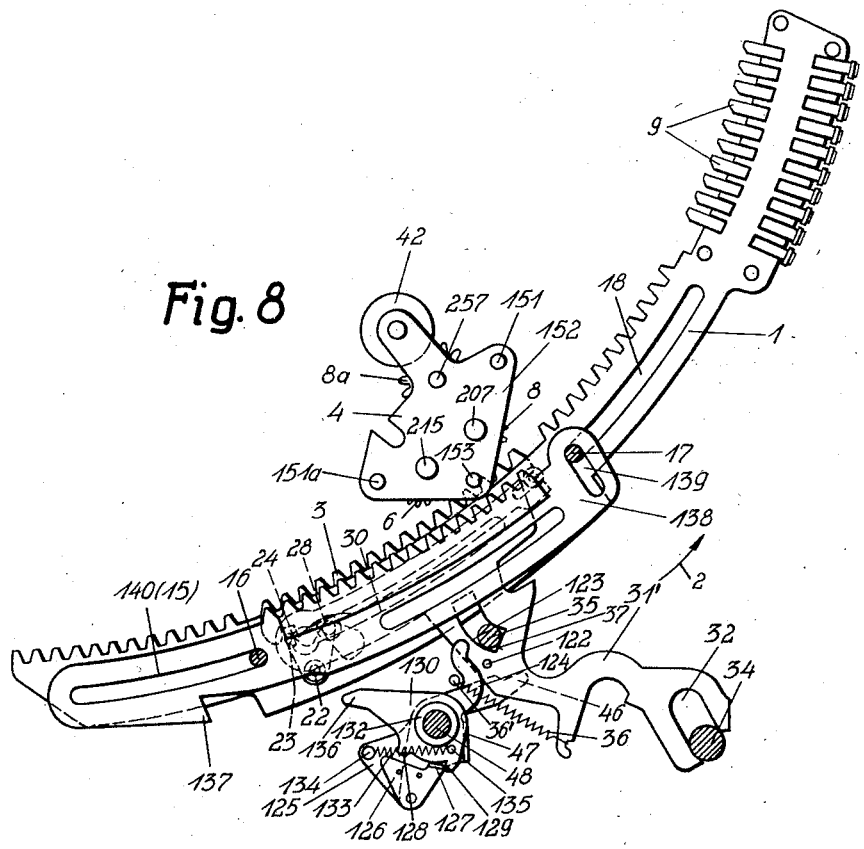
Fig. 8 is an elevation, viewed from the right, of the mechanism for introducing the fugitive 1, in its initial position.
Figure 10:
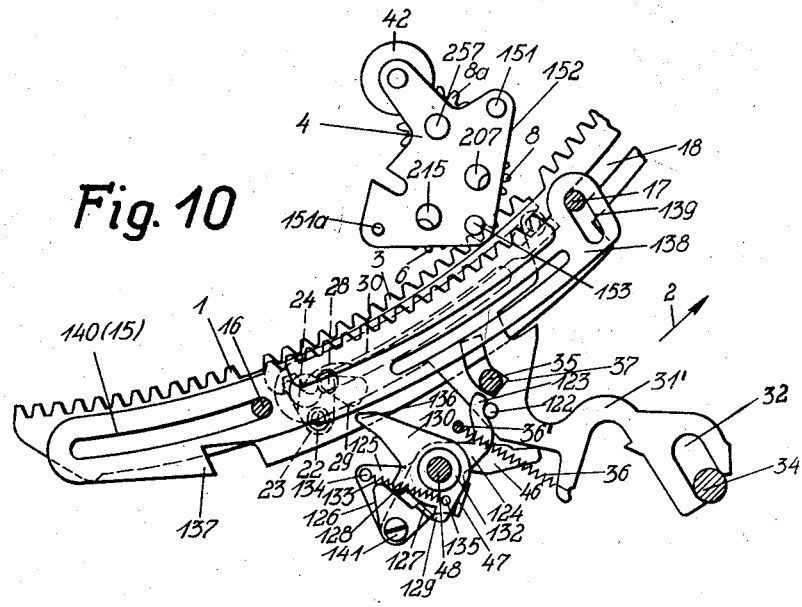
Figure 11:
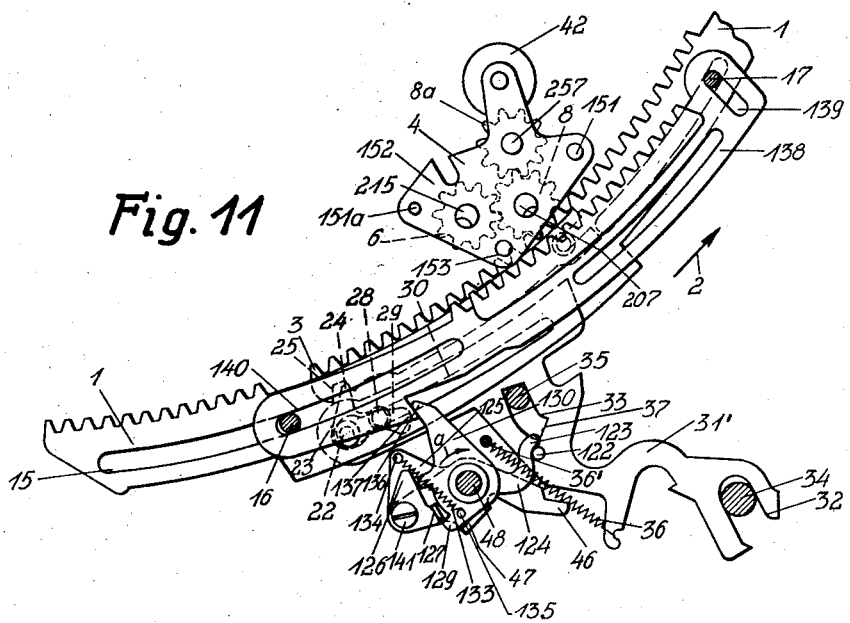

Figs. 10 and 11 are elevations similar to Fig. 8 and show, respectively, the positions the parts occupy when the driving shaft of the machine has returned to its initial position after a partial rotation through 90 degrees, and at the close of the introduction of the fugitive 1.

Figure 12:
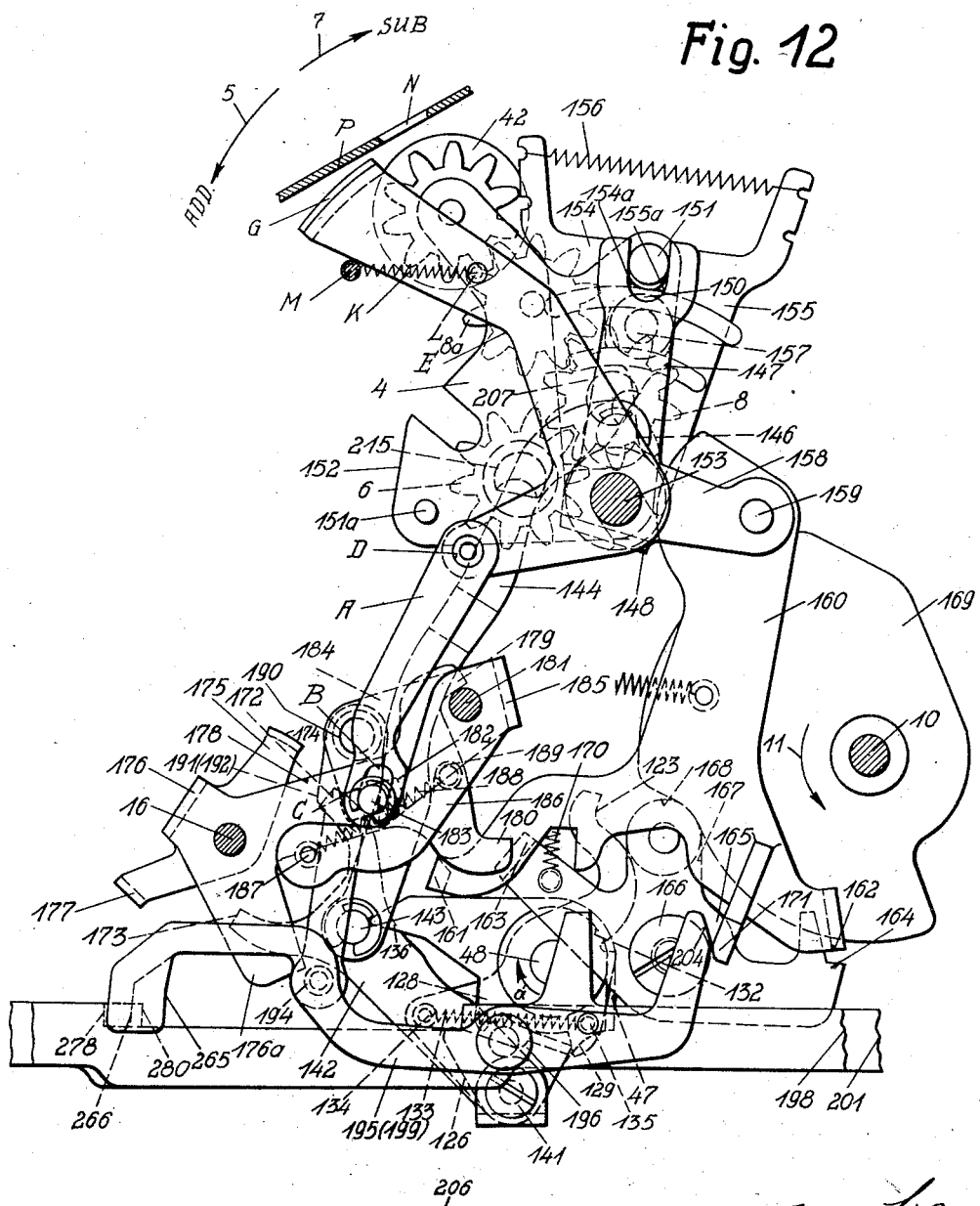

Fig. 12 is an elevation, drawn to a larger scale and viewed from the right, showing the totalizer and the mechanism operatively connected thereto, in their initial position.

Fig. 13 is a perspective detail illustration of certain parts as illustrated in Fig. 12, viewed from the right and the front of the machine, some parts being shown at a distance from each other for the sake of clearness.

Fig. 14 is an elevation which is similar to Fig. 12 showing the parts in the positions they occupy upon completion of the tens transfer in the highest order of the totalizer when its capacity has been exceeded in the negative direction.

Fig. 15 is another perspective detail illustration, viewed as in Fig. 13 and showing other parts from Fig. 12, some of which shown at a distance from each other for the sake of clearness.

Fig. 16 is an elevation which is similar to Fig. 12 showing the parts in the positions they occupy after the fugitive 1 has been introduced negatively.

Figure 17:
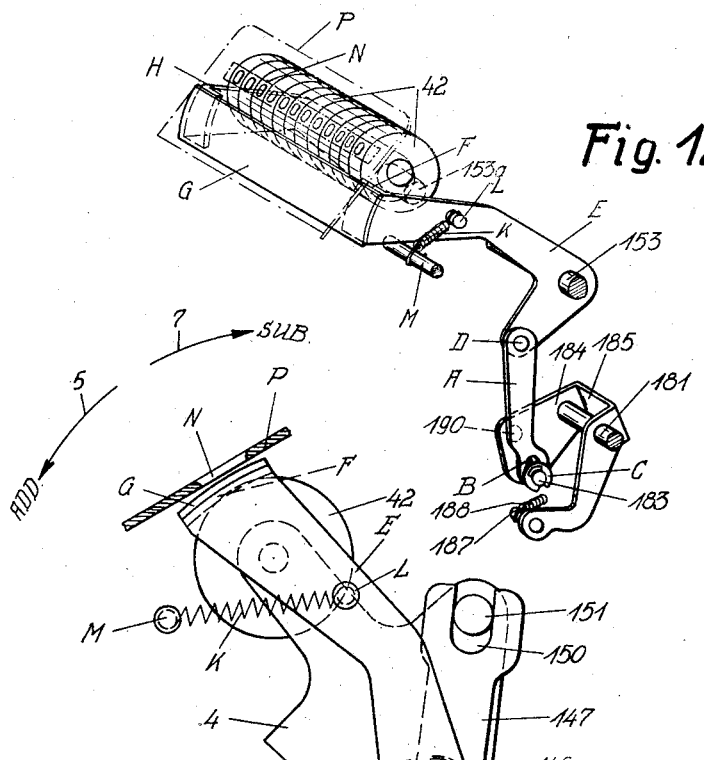

Fig. 17 is a perspective illustration, viewed from the right and the front of the machine and showing a shutter for closing an inspection opening in the top plate of the machine.

Figure 18:
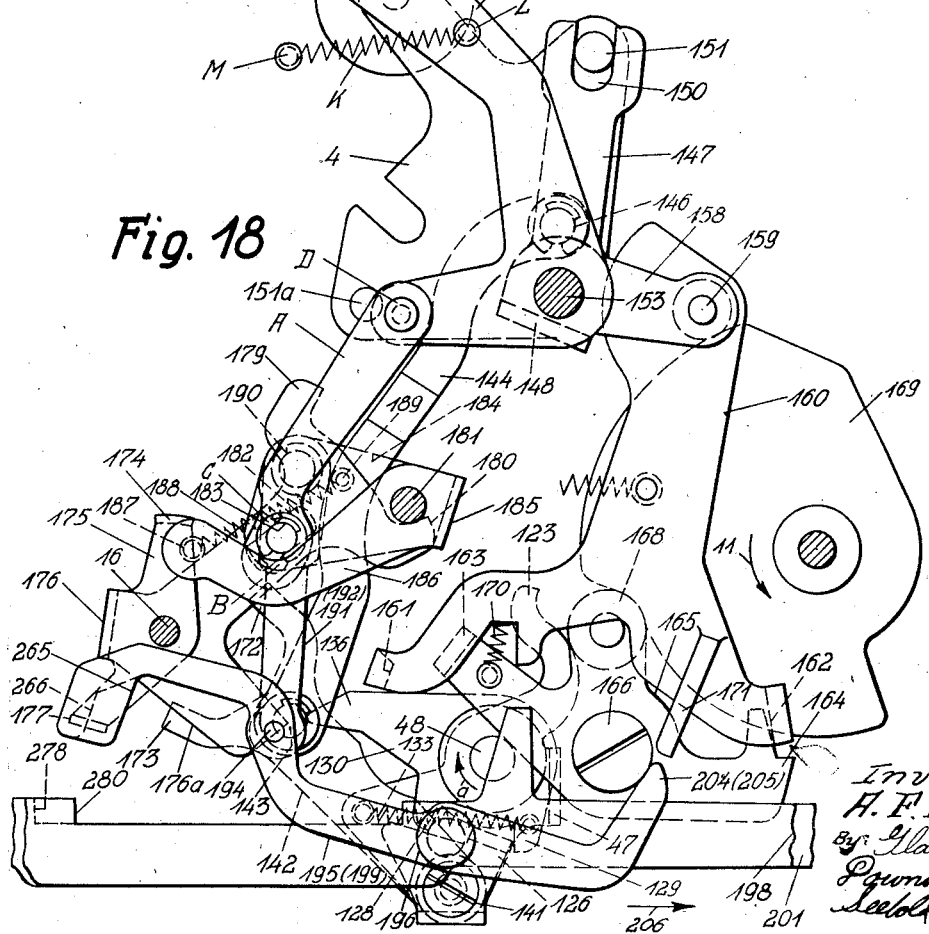
Figure 19:
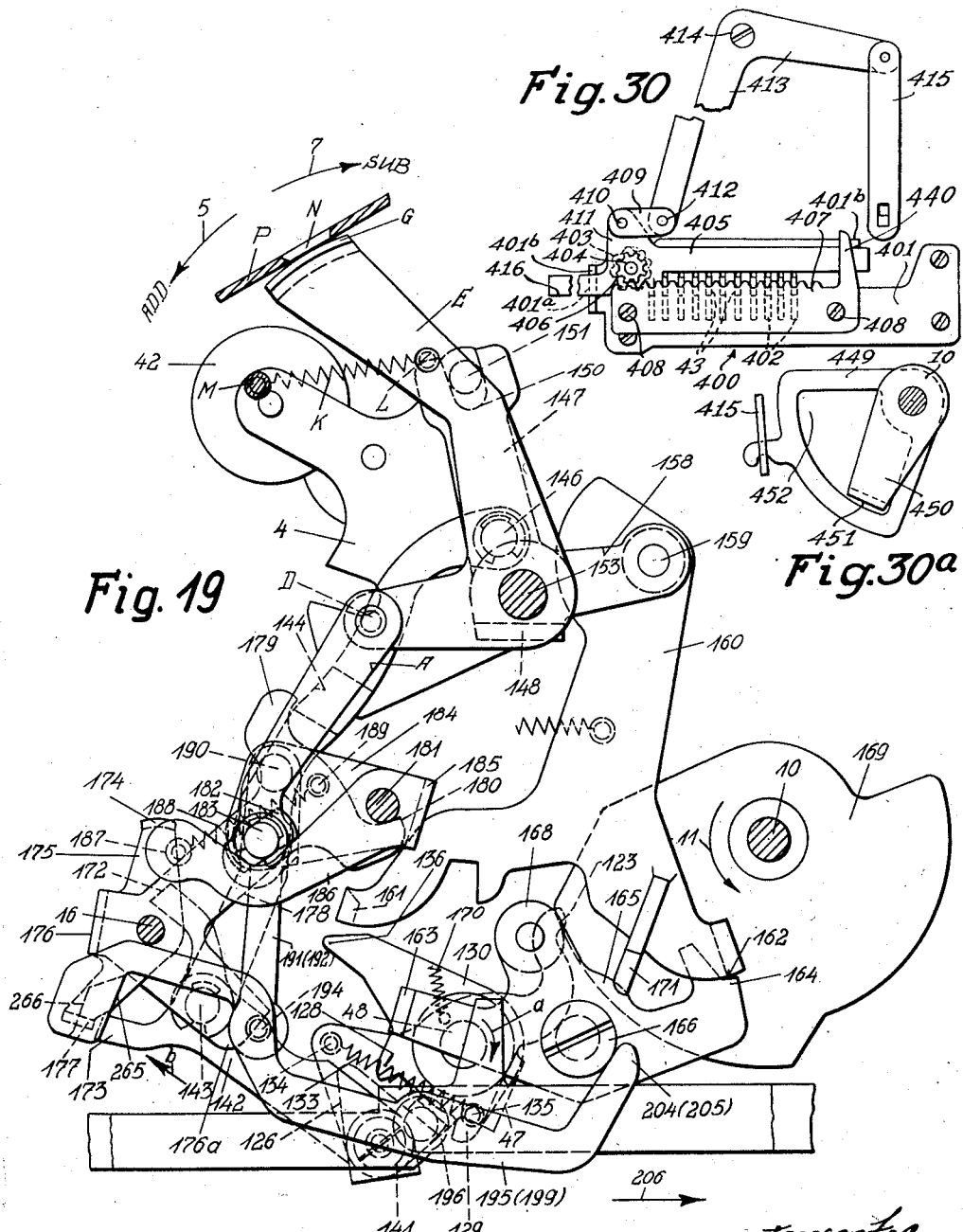
Figure 20:
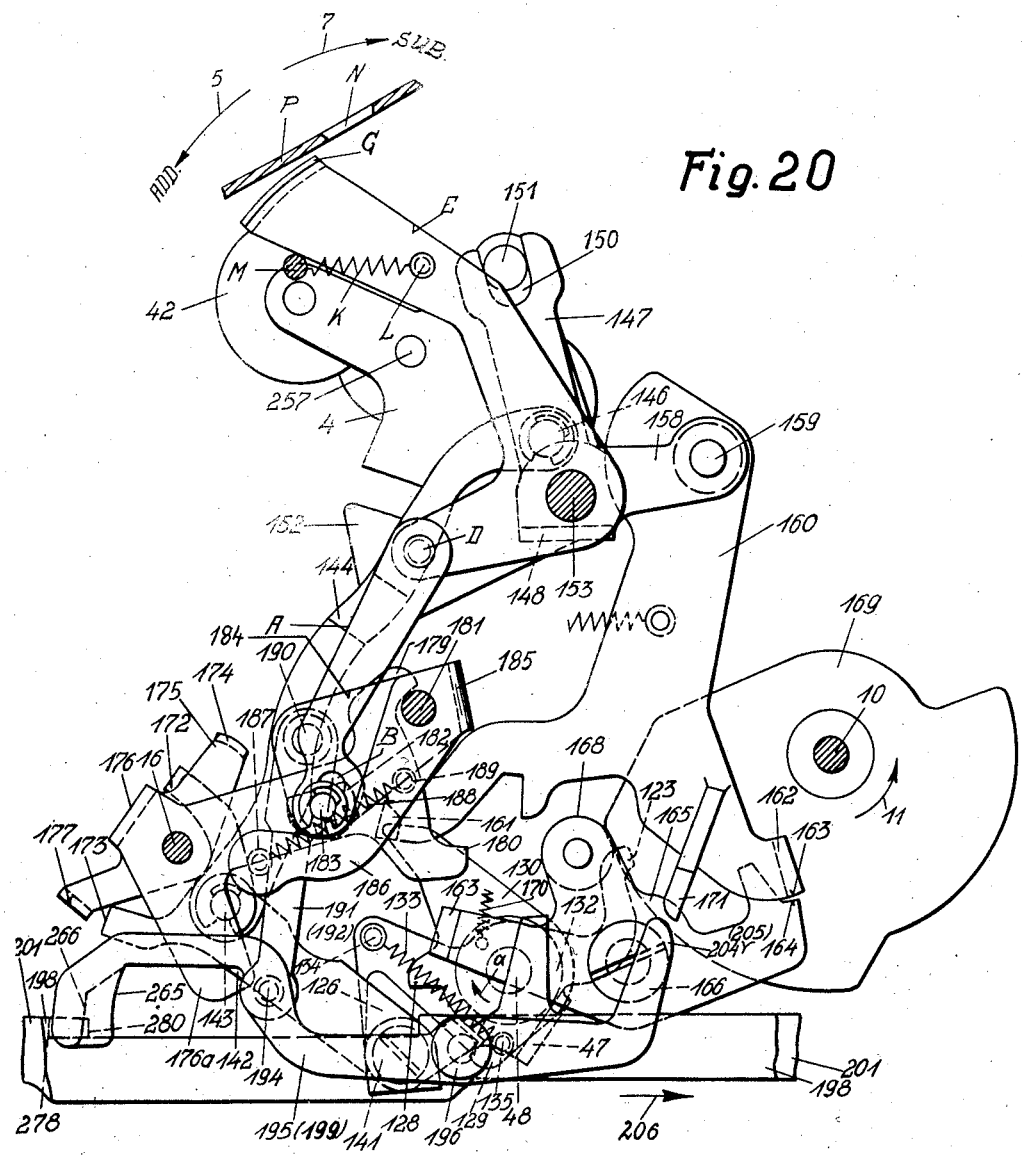

Figs. 18, 19, and 20 are other elevations which are similar to Fig. 12 showing, respectively, the positions of the parts when the driving shaft—which has performed a second partial rotation through 90 degrees upon exceeding the capacity of the totalizer negatively—has returned into its initial position, when the tens transfer has been completed in the highest order of the totalizer if a minus value is exceeded by a plus value, and after the positive introduction of the fugitive 1.

Fig. 21 is an elevation of the totalizer, viewed from the left.

Fig. 22 is a perspective illustration of the cancelling device in the totalizer, for total and subtotal taking, some parts being shown at a distance from each other, and some being broken away for the sake of clearness.

Figs. 23 and 24 are central sections through the totalizer, viewed from the left and, respectively, in the positions of its gears in which the numeral wheels of the totalizer display "0," and in which they display "9."

Fig. 25 is a perspective illustration of the mechanism for printing symbols, viewed from the right and the front of the machine.

Fig. 26 is a perspective illustration which is similar to the one in Fig. 17 but shows a modified shutter, and Figs. 27 to 29, inclusive, show three distinct positions of another modified shutter.

Fig. 30 is a rear elevation of the tens-shift actuating mechanism, and

Fig. 30a is a detailed left side elevation showing the connection of the tens-shift actuating mechanism with the main drive shaft.

1. General description of the controlling mechanism

The machine is preferably driven by a motor but it may also be driven by a crank for manual operation. Through suitable gearing, the motor first turns the driving shaft 10 of the machine through 90 degrees in the direction of the arrow 11, and then back into its initial position for the same angle against the arrow 11. These two partial rotations of the driving shaft through 90 degrees make up what will be referred to as the cycle of the machine. If a crank is provided instead of a motor, the driving shaft 10 is returned into its initial position by a spring.

The machine to which the controlling mechanism has been adapted, is a usual adding machine with a set of ten number keys 12 and a set of six operation keys 13 two of which, viz. the total taking key, with its key bar 200, and the subtotal taking key, with its key bar 197, have been illustrated in Fig. 25.

When an operation key 13 has been depressed, the motor is cut in by means of a switching member 60A (Fig. 2). At the same time, the depressed key is locked down by means that will be fully described below, until a cycle has been completed and the driving shaft 10 has returned into its initial position whereupon the key is released and the motor is cut out by the switching member 60A.

The motor, its switching means and its gearing, have not been illustrated.

Figure 9:
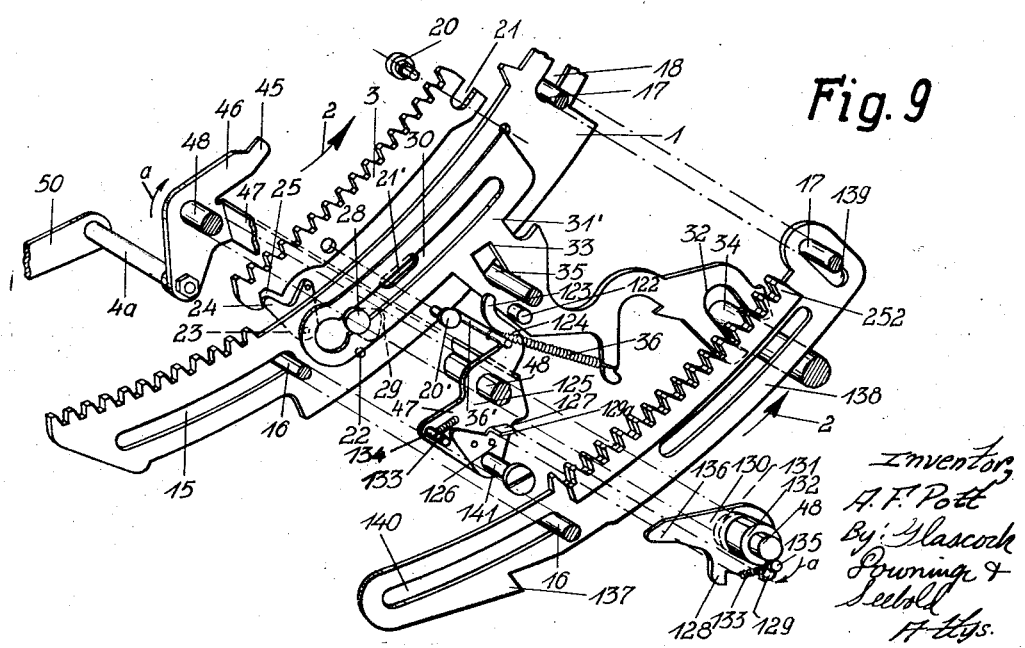
Fig. 9 is a perspective illustration, viewed from the right and the front of the machine, of the parts shown in Fig. 8, some parts being shown at a distance from each other for the sake of clearness.

The ten-key adding machine is equipped with a setting wheel carriage having spring-controlled setting wheels 310 to be operated from the number keys 12 by the usual mechanism, shown in my co-pending application, Serial No. 182,336, filed December 27, 1937. Teeth on each setting wheel 310 mesh with teeth of sectors 1, one sector being allotted to each setting wheel 310. A front slot 15 and a rear slot 18 are made in each sector by which the sectors are guided on a fixed rod 16 at the front of the machine and a rod 17 at its rear which is reciprocated for a purpose to be described below. The sectors 1 have teeth at both ends and a plain central portion where a movable rack 3 is arranged. This rack 3, as best seen in Fig. 9, has a slot 21 in its rear end to guide this end on a headed rivet 20 in the corresponding sector 1. Near its front end the rack 3 is equipped with another headed rivet 20' which slides in a slot 21' in the sector.

The setting wheels 310 which have been rotated in conformity with the values of their number keys 12, are returned into their initial positions by the drive of the machine and, in thus returning, shift the sectors 1 on their rods 16 and 17 in the direction of the arrow 2 in conformity with the values which have been introduced. This movement is transmitted to a totalizer 4 through the racks 3. The totalizer 4 has an end plate 229 at the left, an intermediate plate 234, Fig. 22, and an end plate 152 at the right. The end plates 152 and 229 are connected by stays 151 and 151a which extend through holes in the intermediate plate 234. The end plate 229 at the left is mounted to swing about a trunnion 153a in the left-hand side plate—not shown—of the machine. Similarly, the end plate 152 is mounted on a trunnion 153 supported by the right-hand side plate of the machine and intermediate frame plate, both not shown. Addition gear wheels 6, with tens shift cams 41 (Fig. 22), are mounted on a shaft 215 in the totalizer 4, and subtraction gear wheels 8, with tens-shift cams 40, are mounted an another shaft 207. The gear wheels 6 and 8 are in mesh, and an intermediate gear wheel 8a on a shaft 257 is inserted between each subtraction wheel and the corresponding numeral wheel 42. A portion of the top plate P of the machine, with an inspection hole N for exposing the number wheels 42, has been shown in Fig. 12.

When values are introduced additively into the totalizer 4, it is rocked about its trunnions 153 and 153a in the direction of the arrow "5 Add" to engage the addition wheels 6 with the racks 3 on the sectors 1. When values are introduced subtractively, the totalizer 4 is rocked in the opposite direction, arrow "Sub 7," and the subtraction wheels 8 of the totalizer mesh with the rack 3.

The values which have been introduced are printed by types 9 on the upper ends of the sectors 1 which are driven against a sheet on the paper cylinder or platen 312 of the machine by the usual hammer mechanism 311. The symbols on the operation keys 13 are printed by an arcuate member 273, Fig. 25, as will be described in due course.

The object of the invention is as follows:

Suppose that there is a plus value in the totalizer 4 which, for instance, has 11 places. Suppose that this plus value is "000 000 005 75" and that the minus value "752" is to be subtracted therefrom. When the first cycle has been completed, there appears in the totalizer 4 an intermediate value which is the complement of the negative balance without deduction of the fugitive 1, and, in the present instance, is "999 999 998 23." In order that this complementary may be printed in positive form on the paper of the platen 312, the keys are locked during the first cycle and the drive of the machine is engaged for another cycle, to introduce the fugitive 1.

The introduction of the fugitive 1 is necessary because the machine has two total taking mechanisms which are operated by a single key, the numeral wheels 42 of the totalizer 4 being returned to "0" if it is desired to print a positive value by total taking, and advanced to "9" if it is desired to print a negative value in positive form by total taking.

During the second cycle of the machine, the fugitive 1 is subtracted from the complementary value "999 999 998 23," and the numeral wheels 42 of the totalizer 4 now indicate 999 999 998 22. The negative balance is now printed in positive form by total or subtotal taking, the numeral wheels 42 being advanced to "9." In the present instance, the positive form of the negative balance is "177." When the capacity of the totalizer 4 is exceeded, in the negative sense, the inspection opening N is closed by a shutter, as will be described.

If, on the other hand, to a minus value, for instance, 999 999 999 951 is added a plus value "75," the complementary value "000 000 000 026" appears in the totalizer 4 after the first cycle has been completed, this being the positive balance without the fugitive 1. As the value 999 999 999 951 represents an understepping of the zero position for 50, the fugitive 1 must be added in order that the positive value be correctly indicated in the totalizer 4 and printed. This is the reason why, during the first cycle, the keys are locked and the drive of the machine is released for one more cycle for introducing the fugitive 1. During this second cycle the fugitive 1 is inserted and the totalizer 4 now displays the real positive balance "000 000 000 27."

The circuit of the motor has been closed during the introduction of positive or negative values by the key locking means, and to prevent interruption thereof during the second cycle, and to prevent the depression of number and operation keys during this cycle, means have been provided which will now be described.

2. *The means for locking the number and operation keys*

As mentioned, there are as many sectors 1 as there are denominational wheels in the totalizer 4, that is, eleven. It has been described that the sectors 1, by their slots 15, are mounted to slide on the rod 16 secured in the left and right-hand side plates of the machine, and, by their slots 18, are mounted to slide on the other rod 17 which is positively reciprocated in the slots 18 of the sectors 1 by the drive of the machine. As also described, the rack 3 at the left-hand side of each sector 1 adjacent its plain central portion is guided by the slot-and-rivet means 20, 21 and 20', 21'.

Figure 1:
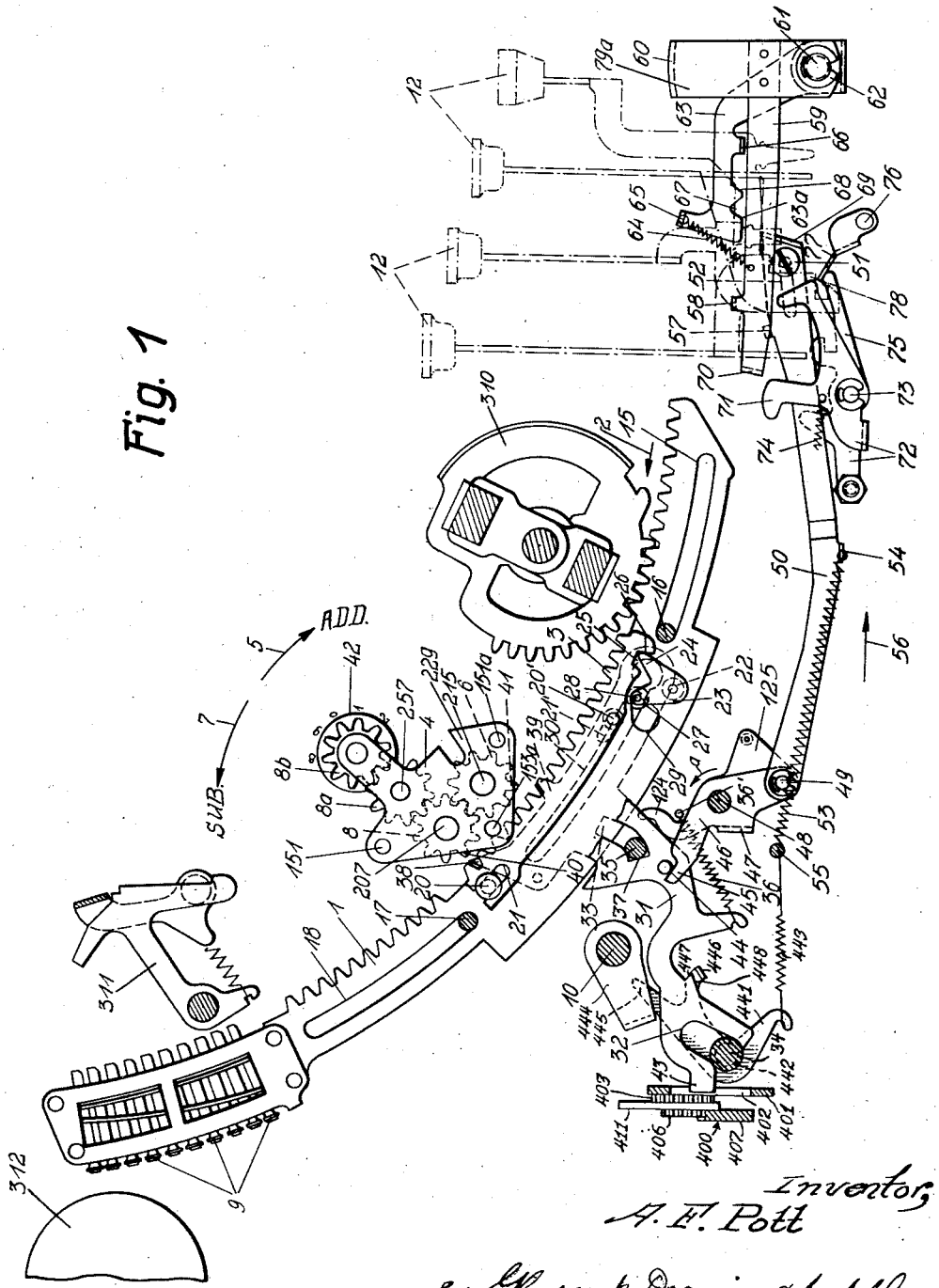
Fig. 1 is an elevation of the control mechanism in its initial position, viewed from the left of the machine.

A pawl 23, as best seen in Figs. 1 and 9, is fulcrumed at the left-hand side of each sector 1 about a rivet pin 22. The free end of the pawl 23 is forked. Its arm 24 lies in a notch 25 in the lower edge of the rack 3 and normally contacts the front edge 26 of the slot, so that the rack 3 can move in the direction of the arrow 2 only while positively engaged by the pawl 23. A rivet 28 is inserted in the other arm 27 of the pawl 23 and extends through an ovate or drop-shaped hole 29 in the sector 1 and into a longitudinal slot 30 in the corresponding tens-shift member 31 and the tens-shift member 31' of the units place.

The tens-shift members 31, as best seen in Fig. 7, have each a slotted tail 32 by which they are guided on a rod 34, and an arcuate slot 33 in the body which engages about an abutment rod 35. A spring 36 whose rear end is connected to a hook projecting from the member 31, and whose front end is secured to a transversely extending rod 36', pulls the member in upward direction until the lower end 37 of its arcuate slot 33 bears against the rod 35 from below, thus defining the initial position of the member 31. With the exception of the tens-shift member 31' at the right-hand side of the sector 1 at the units place, Fig. 7, each tens-shift member 31 has a pair of cams 38 and 39 projecting from its upper edge for cooperation, respectively, with the tens-shift cams 40 and 41 of the corresponding denominational gears 8 and 6 in the totalizer 4, the cams 40 and 41 being best seen in Fig. 22. When the totalizer 4 is rocked about its trunnions 153 and 153a in the direction of the arrow "5 Add" in Fig. 1, for addition, the tens-shift cams 41 on the addition gears 6 cooperate with the cams 39 of the corresponding tens-shift members 31 when the number wheels 42 move from "9" to "0." When the totalizer 4 is turned in the direction of the arrow "Sub 7," for subtraction, the cams 40 on the subtraction gears 8 perform a similar function with respect to the cams 38 when the number wheels 42 move from "0" to "9." By these means, the tens transfer to the next higher denomination is prepared for operation. For completing the tens transfer, the tail 32 of each tens-shift member 31, with the exception of units shift member 31', has a rearward extension 43 for cooperation with the tens-shift actuating mechanism indicated generally at 400, Fig. 1.

The tens-shift actuating mechanism is well known in commerce and is embodied in a ten-key adding machine marketed under the trade name "Mercedes," and comprises a plate 401 secured to the machine frame at the rear, extending transversely of the machine and having a plurality of vertically arranged parallel slots 402 which receive and guide the ends of the extensions 43 of tens-shift members 31. When the members 31 are in their normal or rest positions (Fig. 1), the rear ends of the extensions 43 are flush with the rear surface of the plate 401. When a tens-shift member 31 is actuated by its corresponding cam 38 or 40, its extension 43 is moved to the left to the position shown in Fig. 2a, into the path of movement of a toothed cam wheel 403. Curved latches 441 are journaled in annular grooves 442 in rod 34 and interposed between the extensions 43. The latches are tensioned counterclockwise by springs 443 between the lower ends of the latches and the rod 55. When the machine is at rest, a universal bail 444 secured on the driving shaft 10 abuts upward extensions 445 formed on the latches 441 to restrain the offset ears 446 formed on the latches 441 from engaging shoulders 447 formed on the tens-shift members 31, as shown in Fig. 1. When, however, the machine starts a cycle of operations and the universal bail 444 swings clockwise away from the latches 441, the latches are permitted to rotate counterclockwise under the tension of their springs 443 to bring the ears 446 into tensioned engagement with the surfaces 448 lying immediately beneath the shoulders 447 of the latches. When a tens-shift member 31 is moved from its normal or rest position, under the action of its corresponding cam 38 or 40, its extension shifts to the left to the position shown in Fig. 2a, and the ear 446 of the corresponding latch 441 engages the shoulder 447 to hold the tens-shift member latched in the position shown in Fig. 2a in readiness to be actuated by the toothed cam wheel 403, as will hereafter be described.

Wheel 403 is mounted on one end of a stub shaft 404 journaled in a bar 405 suitably mounted for horizontal reciprocatory sliding movement in recesses such as 401a (Fig. 30) in the rearwardly projecting flanges 401b formed on the plate 401. A pinion 406 secured on the opposite end of the stub shaft 404 meshes with a rack 407 secured by screws 408 to the machine frame. An upstanding projection 440 on the rack 407 and the teeth on the rack serve to hold the bar 405 for sliding movement within the recesses 401a. A link 409, pivoted at 410 to an upstanding projection 411 formed on the bar 405 and pivoted at 412 to one arm of a bell crank 413, connects the bar 405 for actuation by the bell crank. Bell crank 413 is pivoted at 414 on the machine frame, and its remaining arm is pivoted to a vertically disposed link 415, the lower end of which has a lug and slot connection with an oscillating member 449 (Fig. 30a) loosely mounted on the drive shaft 10. An arm 450 secured to the shaft 10 has an inturned flange 451 riding within a segment-shaped opening 452 formed in the oscillatory member 449. During the clockwise movement of the drive shaft 10 at each machine cycle, the inturned flange 451, after a substantial idle movement within the segmental opening 452, engages the upper wall of the opening and rocks the oscillatory member clockwise to impart upward movement to the link 415. During the succeeding counterclockwise movement of drive shaft 10 at each machine cycle, the inturned flange 451 retraces its path and a substantial idle movement in the segmental opening 452, engages the lower wall of the opening to impart downward movement to the link 415. By the above connections the link 415 is reciprocated vertically during each cycle of the machine and, in turn, rocks the bell crank 413 first counterclockwise, and then clockwise, about pivot 412 during each machine cycle.

Through the connection of link 409, this movement shifts the reciprocatory bar 405 first to the right, as viewed in Fig. 30, and then to the left, during each cycle of the machine, causing the pinion 406 to be rotated by engagement with its rack 407 and, in turn, causing rotation of the toothed cam wheel 403. The timing of the rightward movement of the reciprocatory bar 405 and clockwise rotation of wheel 403 is such that the teeth of wheel 403 engage seriatim the rear ends of any extensions 43 that may have been latched in the path of movement of the wheel by the action of cams 38 and 40 and the latches 441, shortly after such latching action occurs.

Following the engagement of a tooth of wheel 403 with an extension 43, the continued rotation of the wheel causes the tooth to cam the extension, together with its tens-shift member 31, downwardly to the position shown in Fig. 2, thus effecting a tens transfer as will hereinafter appear. The lower downwardly offset edge 416 of the left end of the reciprocatory bar 405 engages the upper edge of the extensions 43 as they are depressed, to retain the extensions depressed and this holds the shoulders 447 away from the ears 446, as shown in Fig. 2, until that point in the cycle when the totalizer 4 is disengaged from the sectors 1, thus insuring the registration of the transfer upon the totalizer before the reciprocatory bar 405 is returned leftward to its normal or home position, as shown in Fig. 30. As the reciprocatory bar 405 moves to the left its downwardly offset left hand end successively releases the extensions 43 from the position shown in Fig. 2, whereupon such extensions of the tens-shift members return to the positions shown in Fig. 2a under the tension of the springs 36. Also the latch-controlling bail 444 swings counterclockwise and engages the extensions 445 of the latches 441, withdrawing the ears 446 from latching position relatively to the shoulders 447 of the tens-shift members, whereupon the extensions 43 are released and the tens-shift members 31 restore to their normal positions shown in Fig. 1 under the tension of springs 36.

Arranged at the left of the sector 1 which corresponds to the highest denomination is an extra tens-shift member 31, Figs. 1 and 7. The cams 38 and 39 of this extra member cooperate with the tens-shift cams 41 and 40 for the gear wheels 6 and 8 of the highest denomination. A pin 44 is riveted into the extra member 31 and cooperates with the upper end 45 of the left-hand arm 46 of a coupling frame 47, whose right-hand arm 125, Fig. 7, has an extension 124, the free end 123 of which engages a pin 122 in the tens-shift member 31' of the units denomination. The arms 46 and 125 are fulcrumed on a rod 48 secured in the left-hand side plate and in an intermediate frame plate—both not shown—of the machine.

A bolt 49 is screwed into the lower end of the left-hand arm 46 of the coupling frame 47 and on this bolt is pivoted the rear end of a locking slide 50 whose front end carries a laterally extending lip 69 and is slotted at 52 for sliding on a headed screw 51 in the left-hand side plate of the machine. A spring 53 whose front end is connected to a lug 54 extending from the lower edge of the locking slide 50, and whose rear end is anchored on a rod 55, pulls the slide 50 to the rear against the arrow 56 and turns the coupling frame 47 against the arrow "a." The initial position of the slide 50 and frame 47 is defined by the end 45 of the arm 46 engaging the pin 44 on the extra tens-shift member 31.

A frame for locking the operation keys 13, as best seen in Figs. 1 to 7, comprises a cross bar 60, an arm 79a at the left, and an arm 79 at the right by which the frame is pivoted about a rod 61 secured in the side plates of the machine. The arm 79a is held on the rod 61 by a spring washer 62. Secured to the inner side of the arm 79a is a pusher 59 which extends to the rear and is equipped with a horizontal lug 58 extending to the right from its upper edge, and a hook 70 at its rear end. A lug 57 extends to the left from the upper edge of the locking slide 50 for cooperation with the lug 58 of the pusher 59. A catch 63 is mounted to swing on the rod 61 at the inner side of the arm 79a. The catch 63 has a lug 66 which extends to the left and is held against the upper edge of the pusher 59 by a spring 64 whose lower end is anchored in the pusher 59 and whose upper end is connected to a lug 65 at the upper end of the catch 63. This defines the initial position of the catch 63. Notches 67 and 68 are formed in the lower edge of the catch 63 for engaging alternately the lip 69 of the slide 50 which extends to the right from the slide.

The means for locking the number keys 12 will now be described. The hook 70 (Figs. 1, 2, 3 and 7) which extends to the right from the rear end of the pusher 59, cooperates with an arm 71 forming part of a locking-control frame 72 fulcrumed about a shaft 73 in the left-hand side plate of the machine and an intermdiate frame plate—not shown. An arm 75 extends in forward direction from the frame 72 and a spring 74 turns the locking control frame 72 anti-clockwise and the front end of the arm 75, Fig. 1, engages a locking strip 77 fulcrumed about a shaft 76. The locking strip 77 is turned clockwise and engages lugs 78 on the key bars of the number keys 12. When a key 12 is depressed, its lug 78 swings the locking strip 77 anti-clockwise which, through arm 75, turns the locking control frame 72 clockwise against its spring 74, and the arm 71 of the frame 72 engages below the hook 70 at the rear end of the pusher 59.

Secured to the inner side of the right-hand arm 79 of the operation key locking frame 60, Figs. 4, 5, 6 and 7, is a bracket 80 which at its rear end carries a spring hook 81. A spring 82 extends from this to a spring hook 83 of an unlocking arm 84 whose hub is bent to the shape of the letter U and is placed on the right-hand end of the bar 61 at the outer side of the arm 79. The spring 82 pulls a lug 85 of the unlocking arm 84 against an abutment 86 on the bracket 80, as best seen in Fig. 5. A rivet pin 87 is inserted in the arm 84 and on this is pivotally mounted and held by a spring washer 89, the front end of an unlocking slide 88 whose rear end is slotted at 90 and is mounted to slide on a headed rivet 91 in the right-hand side plate of the machine. A lever 93 is pivotally connected to the unlocking slide 88 by a rivet pin 92, and a rivet 95 which engages in a recess 94 in the lever 93 limits the swinging movement of the lever 93 with respect to the slide 88. A spring 97 which connects a pin 96 in the lever 93 to the rivet 91 by which the slotted rear end of the unlocking slide 88 is guided, turns the lever 93 anti-clockwise and holds the base of the recess 94 in the lever 93 against the rivet 95 in the unlocking slide 88. This position is shown in Fig. 4. The rear end 98 of the lever 93 is engaged by a lug 100 (Figs. 4 to 6) on a cam plate 101 mounted to rotate on the driving shaft 10 by a square bearing hub 102. The lug 100 extends to the right from the cam plate 101 and its front side 99 engages the end 98 of the lever 93. The cam plate 101 performs the same cycle as the machine, that is, 90 degrees in the direction of the arrow 11, and the same angle in the opposite direction, as described for the driving shaft 10. The means for actuating the cam plate 101 from the drive of the machine have not been illustrated.

The front end 103 as best seen in Figs. 4, 5, 6 and 7 of the lever 93 is recessed at 104 for engaging a lug 105 extending to the right from the lower end of a connecting rod 106. The upper end of the connecting rod 106 is pivoted on a rivet pin 106a, Fig. 7, at the rear end of an operating frame 107 fulcrumed about a shaft 108 secured in the right-hand side plate and an intermediate frame plate, and held by spring washers (not shown). A spring 109, Figs. 4, 5, and 6, whose upper end is connected to a spring hook 110 of the connecting rod 106, and whose lower end is anchored in a holder 111 below the bottom plate 112 of the machine, tends to turn the connecting rod 106 anti-clockwise as viewed in Figs. 4 to 6. The connecting rod 106 extends through a hole 115 in the bottom plate 112 and the spring 109 holds the rear edge 113 of the connecting rod 106 against the rear end 114 of the hole 115. At the same time, the spring 109 turns the frame 107 clockwise. A tongue 116 extends to the left from the front end of the frame 107 for cooperation with the operation keys 13, as will presently be described.

The key stems of the operation keys 13, Figs. 4 and 26, with the exception of the repetition key, are riveted to bellcranks 117 at their lower ends, Fig. 25. The bellcranks 117 are mounted to swing about the shaft 108 on which the operating frame 107 is fulcrumed. The lower end of the bellcrank 117, associated with the total taking key 13 is pivoted to a total slide 201, and the lower end of the bellcrank 117 associated with the subtotal key 13, is pivoted to a subtotal slide 198, at 117a. Springs 117b tend to turn the bellcranks 117 clockwise. At its upper end, each bellcrank 117 has a sector-shaped cam, with a notch 119 and a tooth 120 at the lower side of the notch 119. Under the action of the spring 109 the tongue 116 of the operating frame 107 bears upwardly against the lower edges of the bellcranks 117. When one of the operating keys 13 is depressed the locking bar 60 of the frame 79, 79a, 60 engages in the notch 119 of the bellcrank 117 which is connected to the depressed key. At the same time the bar 60 engages below the teeth 120 of the bellcranks 117 allotted to the other keys 13 so that the operating keys not depressed are locked in the rest position.

3. *The operation of the locking means for the keys 12 and 13*

The operation of the locking means when the capacity of the totalizer is exceeded in the negative direction will now be described. Assume by way of example that it is intended to introduce the numeral "2" subtractively into the totalizer 4 which is in zero position.

When the number key 12 with the numeral "2" is depressed, the corresponding setting wheel 310 (Fig. 1) which, as described, is mounted on a setting-wheel carriage and controlled by a spring, is rotated for two units by mechanism, not shown. At the same time, an abutment 78 on the said key 12 acts on the locking strip 77 and swings this anti-clockwise about its shaft 76. The strip 77 acts on the arm 75 of the locking-control frame 72 and swings this frame clockwise about the shaft 73 against the action of the spring 74. When the number key 12 is released the setting wheel carriage is moved to the left one step and the setting wheel 310 which, as mentioned, has been rotated for two units, is moved into operative connection with the sector 1 of the lowest calculating order. For calculating the value "2" subtractively, the subtraction key 13 is depressed and its bellcrank 117 is turned anti-clockwise. The bellcrank 117 now exerts pressure on the tongue 116 of the operating frame 107 and the frame is turned anti-clockwise against the action of the spring 109. The coupling rod 106 is now raised and its lug 105 engages in the recess 104 of the double-armed lever 93, Fig. 5, turning this clockwise against the action of the spring 97 and moving its rear end 98 away from the lug 100 of the cam plate 101. The unlocking slide 88 and the lever 93 are now shifted under the action of the spring 97 to the rear, as indicated by the arrow 121, until the end 90a of the slot 90 in the unlocking slide 88 bears against the headed rivet 91. The front end of the unlocking slide 88 is pivotally connected to the arm 84 at 87, Figs. 4, 5 and 6, as described, and when the unlocking slide 88 is shifted in the direction of the arrow 121, the arm 84 is turned about the bar 61 anti-clockwise, as viewed in Fig. 7. Now the lug 85 of the arm 84 is in engagement with the abutment 86 of the bracket 80 which, as described, is secured to the right-hand arm 79 of the locking bar 60. The bracket 80, the arm 84, and the locking bar 60 are now turned anti-clockwise about the bar 61. This causes the locking bar 60 to enter the notch 119, Fig. 4, of the bellcrank 117 allotted to the subtraction key 13, holding the subtraction key depressed. At the same time, the locking bar 60 engages below the teeth 120 of the bellcranks 117 allotted to the other operation keys, preventing depression of another operation key.

When the locking bar 60 is moved anti-clockwise into its locking position, as shown in Fig. 2, the hook 70 at the rear end of the pusher 59—which, it will be remembered, is secured to the left-hand arm 79a of the locking bar 60—moves toward the front edge of the arm 71 on the locking control frame 72 and, through the means operatively connected to this frame 72, as described, also prevents depression of the number keys 12 for introducing a value, as the locking-control frame 72 which, upon depression of a number key 12, tends to turn clockwise, is now prevented from turning by the arm 71 engaging the hook 70 of the pusher 59. In the vertical or initial position of the locking frame 60, 79, 79a, as shown in Fig. 1, the rear end 63a of the catch 63 which, through spring 64, is moved anti-clockwise with the pusher 59, is intercepted by the hook 69 of the locking slide 50 after the locking control frame 72 has been turned through a certain angle so that the catch 63 is now arrested and tension is put on the spring 64 upon further movement of the pusher 59.

When the locking frame 72 has been moved into its locking position the contact in the circuit of the motor is closed by the switching member 60A and mechanism, not shown. The motor now is started and, through the drive of the machine, throws the totalizer 4 into subtraction position, that is, in the direction of the arrow "Sub 7" in Fig. 1. In this position of the totalizer 4, its driving gear wheels 8 mesh with the racks 3 of the sectors 1. Hereupon, that setting wheel 310 of the setting-wheel carriage which has been rotated for two units by depression of the said number key "2," is returned into its initial position and shifts the sector 1 of the lowest order for two units in the direction of the arrow 2. The rack 3 of this sector, through gear wheels 8, 8a, and 8b, turns the number wheel 42 of the lowest order in the totalizer 4 through two units in clockwise direction. When this number wheel 42 changes from "0" to "9," the widened tens-shift cam 40, Fig. 22, of the driving gear 8 of the lowest or units order engages the cam 38 of the tens-shift member 31 of the next higher or tens order. The tens shift member 31 of this order is now shifted downwards at an inclined angle by its tail 32, and slot 33. This tens-shift member 31 whose rearward extension 43, due to the shifting of the member, extends into the path of movement of wheel 403 and is now depressed by the cam wheel 403 into its active position, Fig. 2, in downward direction by the said actuating members. As has been described, a rivet 28 in the arm 27 of the pawl 23 engages in a longitudinal slot 30 in each tens-shift member 31 through the hole 29 in the corresponding sector 1. The shifting of the tens-shift member 31 of the tens order causes the pawl 23 on the corresponding sector 1 to swing anti-clockwise and its arm 24 to shift the rack 3 of the sector 1 at the tens order for one unit in the direction of the arrow 2. By this shifting of the rack 3, the set of gear wheels 8, 8a, 8b, and the number wheel 42 at the tens place of the totalizer 4 are turned through one unit subtractively, and similar operations as explained in connection with the units number wheel 42, are performed when the tens number wheel 42 turns from "0" to "9." These operations are repeated step by step until the highest, calculating order. At the moment the number wheel 42 at the highest order of the totalizer 4 is turned from "0" to "9" in consequence of the said tens-shifting operations, the tens-shift cam 40 of the driving gear 8 of this order prepares in the usual manner the tens-shift slide 31 at the left of the sector 1 of the highest order, and this tens-shift member 31 is also shifted into its lower final position, Fig. 2, by its rearward extension 43 being depressed by cam wheel 403. The pin 44 of this tens-shift member 31 acts on the upper end 45 of the arm 46 at the left of the coupling frame 47 and swings this frame 47 in the direction a, Fig. 1, about its rod 48. This, through bolt 49, shifts the locking slide 50 forward in the direction of the arrow 56 against its spring 53. The lug 57 of the locking slide 50 is now over the lug 58 of the pusher 59. At the same time, the rear end 63a of the catch 63 is cleared by the lip 69 at the front end of the locking slide 50 which lip now enters the notch 67 in the catch 63 and, as the catch 63 is no longer retained by engagement of its rear end 63a with the lip 69 from above, the tensioned spring 64 turns the catch 63 anti-clockwise until it is arrested by its lug 66 bearing against the upper edge of the pusher 59. The lip 69 at the front end of the locking slide 50 is now caught in the notch 67. The locking slide 50 and the coupling frame 47 are now arrested in the positions shown in Fig. 2.

The drive of the machine now completes the partial rotation through 90 degrees of its driving shaft 10 in the direction of the arrow 11 and the driving shaft 10 then returns into its initial position. At the same time the tens-shift members 31 which have now been released by removal of the lower edge 416 of bar 405 from over their extensions 43, return into their initial positions under the action of their springs 36.

Shortly before the cam plate 101, Figs. 4 to 6, which, as described, rotates with the driving shaft 10, is returned to its normal position, Fig. 6, its lug 100 engages the rear end 98 of the lever 93 and shifts the lever and the unlocking slide 88 into their normal positions, as also shown in Fig. 6, against the arrow 121. The unlocking slide 88, through the rivet pin 87, turns the arm 84 back in anti-clockwise direction. The spring 82 which connects the arm 84 to the bracket 80 on the right-hand arms 79 of the locking frame 79, 60, 79a is tensioned and tends to rock the locking frame 79, 60, 79a and, through the pusher 59, the catch 63, in the same direction. This, however, is prevented by the lug 57 which, as shown in Fig. 2, is on the lug 58 of the pusher 59. By these means, the locking frame 79, 60, 79a and the catch are held in locking position, and the return movement of the arm 84 merely tensions the spring 82. As the locking bar 60 of the locking frame 79, 60, 79a remains in its locking position the contact of the motor remains closed, the motor remains active and automatically performs a second cycle.

During this second cycle, the coupling frame 47, in the manner which will be described in section 5, "The operation of the mechanism for introducing the fugitive 1," is rocked further in the direction of the arrow "a" and into the position shown in Fig. 3. The coupling frame 47, through bolt 49, shifts the locking slide 50 further in the direction of the arrow 56 and its lug 57 clears the lug 58 of the pusher 59 while its hook 69 moves from the notch 67 in the catch 63 and enters the notch 68. When, in this relative position of the lugs 57 and 58 at the end of the cycle, the lug 100, Figs. 4 to 6, of the cam plate 101 returns into their normal positions the lever 93, the unlocking slide 88, and the arm 84, the spring 82 of the arm 84 is able to move the locking frame 79, 60, 79a, the pusher 59, and the catch 63 out of the positions in which the number keys 12 and the operation keys 13 are locked, and this positively opens the contact in the motor circuit. The notch 68 in the catch 63 releases the lip 69 of the locking slide 50, and the slide and the coupling frame 47 return into their initial positions under the action of the spring 53, in which initial positions the end 45 of the arm 46 on the coupling frame 47 engages the pin 44 of the tens-shift member 31 which is at the left of the highest order. The number wheel 42 of the lowest or units place has been rotated for two units negatively at the beginning of the first cycle, and this number wheel 42 displays "8" while the number wheels 42 of the remaining denominations are rotated from "0" to "9" by tens shifting. In order to calculate the usual complementary value of the value "2," that is "7," in the units order of the totalizer 4, and in order to print the complementary value in positive form when total or subtotal taking, it is necessary to introduce the fugitive 1 into the lowest calculating place during the second cycle, in the present instance, subtractively. This is effected by the mechanism which will now be described.

4. The mechanism for introducing the fugitive 1

The tens shift member 21, Figs. 7 to 11, arranged at the right hand side of the sector 1 of the units order is without the cams 38 and 39 of the other tens shift members 31, and without their tail 43, so that the tens shift actuating mechanism 400 does not act on this tens-shift slide 31' for the purpose of tens shifting. This tens-shift member 31' which is furthest to the right, is equipped with the pin 122, as described, which projects to the right for cooperation with the end 123 of the extension 124 on the right-hand arm 125 of the coupling frame 47. In the initial position of the coupling frame 47, Fig. 8, the end 123 is at a distance from the pin 122 which corresponds to the angle through which the coupling frame 47 rocks through during the first cycle. Secured to the right-hand arm 125 of the coupling frame 47, preferably by spot welding, is a plate 126 from which a lug 127 extends to the right at right angles. This lug 127 cooperates with a pair of lugs 128 and 129 which project in spaced relation from the lower side of a cancelling pawl 130, as best seen in Fig. 9. The cancelling pawl 130 is mounted to swing about the rod 48 at the right of the coupling frame 47 and a spring 133 tends to turn the cancelling pawl 130 clockwise. In the normal position of the cancelling pawl 130, Fig. 8, its lug 129 bears against the rear edge 129a of the lug 127 of the plate 126. The spring 133 is anchored, at one end, on a pin 134 riveted into the arm 125 of the coupling frame 47, and its other end is attached to a pin 135 secured in the cancelling pawl 130. In this normal position, a tooth 136 at the front end of the cancelling pawl 130 is beyond the path of a hook 137 on a cancelling sector 138 into whose path it projects in the positions illustrated in Figs. 10 and 11. The cancelling sector 138 has a slot 140, Fig. 9, in its front end through which extends the rod 16 on which the front slots of the sectors 1 slide, and in its rear end the canceling sector has a slot 139 which extends transversely to the slot 140 and through which extends the rod 17 which, as described, is reciprocated by the drive of the machine. This rod 17 which slides in the longitudinal slots 18 of the sectors 1, moves the cancelling sector 138 positively upwards with the arrow 2, and downwards against the arrow, during every cycle of the machine.

5. The operation of the mechanism for introducing the fugitive 1

When the coupling frame 47 is moved from the position in Fig. 1 into that in Fig. 2 in the first cycle of the machine in the direction of the arrow "a" while the driving shaft 10 performs its first partial rotation through 90 degrees in the direction of the arrow 11, by tens shifting up to the highest order, as described in section 3, "The operation of the locking means for the keys 12 and 13," the end 123 of the extension 124 at the right of the coupling frame 47 engages the pin 122 of the tens-shift member 31' at the units order, Fig. 10. The coupling frame 47 remains in its shifted position for the present since the locking slide 50 is locked by the lugs 57 and 58, the notch 67, and the lip 69 of the slide 50, as shown in Fig. 2. When the coupling frame 47 was turned in the direction of the arrow "a," the tooth 136, Fig. 7, of the cancelling pawl 130 was also influenced. At this moment, however, the cancelling sector 138 has been shifted by the movable rod 17 so far in the direction of the arrow "2," that is, upwards, that its tooth 137 has moved beyond the tooth 136 of the cancelling pawl 130, so that the pawl 130 can not partake in the movement of the coupling frame 47. In consequence, the spring 133 of the cancelling pawl 130 has been tensioned. When the driving shaft 10 is on its return stroke to its initial position against the arrow 11, the movable rod 17 shifts the cancelling sector 138 against the arrow "2," and the inclined lower edge of the hook 137 slides along the tooth 136 of the cancelling pawl 130. After the hook 137 has moved beyond the tooth 136 of the cancelling pawl 130, the pawl is turned clockwise by its tensioned spring 133 and its tooth 136 projects into the path of the hook 137 of the cancelling sector 138, as shown in Fig. 10. The spring 133 pulls the lug 129 of the cancelling pawl 130 again toward the rear edge 129a of the angular lug 127 on the plate 126.

Now, the machine performs its second cycle. The main driving shaft 10 is again turned through 90 degrees in the direction of the arrow 11. The movable rod 17, through the transverse slot 139, shifts the cancelling sector 138 in the direction of the arrow "2." When the cancelling sector 138 has moved through about four fifths of its stroke, its hook 137 engages the tooth 136 of the cancelling pawl 130 and, as the cancelling sector 138 moves on in the direction of the arrow "2," the cancelling pawl 130 is swung clockwise in the direction of the arrow "a" in Fig. 11. The coupling frame 47 is turned about its rod 48 in the same direction through the lugs 127 and 129 and the plate 126. The end 123 of its right-hand arm 125 which has engaged the pin 122 of the tens shift member 31' at the units order, as described, which member 31' is allotted to the sector 1 of the units order, is now shifted in downward direction on the rods 34 and 35 by its tail 32 and its slot 33. As has been described, the rivet pin 28 engages in a slot 30 in the tens-shift member 31' and the descending member turns the pawl 23 clockwise about its pivot 22 and the arm 24 of the pawl shifts the rack 3 of the corresponding sector 1 at the units order through one unit in the direction of the arrow "2." The rack 3, through the gear wheel 8 and the train of gears 8a and 8b, turns the number wheel 42 at the units order of the totalizer 4 subtractively for one unit, and this number wheel 42 now indicates the complementary value "7."

When the driving shaft 10 returns to its initial position against the arrow "11," the rod 17 pushes back the cancelling sector 138 against the arrow "2" and the hook 137 of the sector clears the tooth 136 of the cancelling pawl 130, so that, when the driving shaft 10 has arrived in its initial position, all parts are free to return to their normal positions, as shown in Fig. 1 under the action of the lug 100 of the cam plate 101 which, as described, engages the rear end 98 of the lever 93, the spring 36 of the tens-shift member 31', and the spring 53 of the locking slide 50.

Obviously, the fugitive 1 may also be added additively to the lowest order if, for instance, a value is calculated additively which exceeds the value which has previously been calculated subtractively. In this case, after the totalizer 4 has been rocked into its additive position in the direction of the arrow "5 Add," Fig. 1, and in the first cycle a number wheel 42 which effects a progressive tens-shift operation has been turned from "9" to "0," and the tens shift cam 41 of the corresponding driving gear wheel 6 has acted on the cam 39 of the allotted tens-shift member 31, for preparing a tens-shift operation to the next higher calculating place, and after this operation has been completed, the cancelling pawl 130 is moved into its preparatory position as shown in Fig. 10 by the tens transfer from order to place up to the highest order. During the second cycle which is automatically started after the first cycle, the fugitive 1 is calculated in the units order as with addition the totalizer 4 is rocked in the direction "5 Add," causing the driving wheels 6 to mesh with the racks 3 and reversing the number wheels 42 which had previously been rotated clockwise.

6. The totalizer control mechanism

If it is desired to take a total or a subtotal after the calculation of minus values during which the capacity of the totalizer 4 has been exceeded negatively beyond the zero position, the mechanism by which the state or add-subtract condition of the machine is determined must be reversed. Such mechanism normally turns the totalizer 4 subtractively when a total or subtotal is taken. Reversing is effected upon exceeding the totalizer capacity in the negative under control of the coupling frame 47 which, as described, controls the key locking means and effects the introduction of the fugitive 1, by the mechanism which will now be described for preparing the totalizer 4 for additive turning, for total or subtotal taking, if any.

A bearing screw 141, Fig. 9, is inserted in the right-hand arm 125 of the coupling frame 47 through a hole in the plate 126, as best seen in Fig. 9. Fulcrumed on the bearing screw 141 is a fork 142, Fig. 13, whose hub is bent to the shape of the letter "U." As described, the trunnion 153 for the right-hand end plate 152 of the totalizer 4 is supported by the right-hand side plate of the machine and an intermediate plate. Mounted to swing on the trunnion 153 at the right of the intermediate plate is a totalizer controlling bellcrank 148 having an upwardly extending arm 147 and a rearwardly extending arm 158. The upper end of the arm 147 is forked at 150 and engages the stay 151 of the totalizer, as shown in Figs. 12, 14, 16, 18, 19, and 20, so that, as the totalizer controlling bellcrank 148 turns about the trunnion 153, the totalizer 4 is positively swung about its trunnions 153 and 153a. The bellcrank 148 is connected to the fork 142 by a coupling rod 144 whose lower end is pivoted on a rivet pin 143 and held by a spring washer 145. The upper end of the coupling rod is connected to a rivet pin 146 in the arm 147 of the bellcrank.

A pair of holders 154 and 155, Fig. 12, are mounted to swing on the trunnion 153 between the right-hand side plate of the machine and the totalizer controlling bellcrank 148. A spring 156 is attached to the upper ends of the holders and tends to pull them together. In the normal position, Fig. 12, of the totalizer 4 the inner edges of the holders engage both sides of the stay 151 and of a rivet 157 in the intermediate plate of the machine, holding the totalizer 4 and the bellcrank 148 in their normal positions.

Pivoted on a rivet pin 159 in the free end of the rearwardly extending bellcrank arm 158 is a T member 160 with a lug 161 extending to the left from the lower front end of the member, and a lug 162 extending to the left from the lower rear end of the member 160. These lugs 161, 162 cooperate, respectively, with lugs 163 and 164 at the front and the rear of a rocker 165, Figs. 12, 14, 16, 18, 19 and 20, fulcrumed on a bearing screw 166 in the intermediate plate of the machine. An arm projects upwardly from the rocker 165 and on this is mounted to rotate a roller 168 for cooperation with a cam plate 169. The cam plate is keyed on the driving shaft 10 and a spring 170 holds the roller 168 against the edge of the cam plate 169. In the normal position of the totalizer 4 and its control, as shown in Fig. 12, the lug 162 of the T member 160 projects into the path of the lug 164 of the rocker 165 and this causes the positioning of the totalizer 4 for addition in the direction of the arrow "5 Add."

A finger 171 projects to the right from the lower end of the T member 160, as best seen in Fig. 13, for a purpose to be described below.

The fork 142 on the bearing screw 141 has a pair of prongs 172 and 173 for cooperation with lugs 174 and 177 of a yoke 176. When the fork 142 is raised its upper prong 172 is in position for cooperation with the lug 174 and when it is lowered its lower prong 173 is in a similar position with respect to the lug 177. The two lugs 174 and 177 extend angularly from the left-hand side of a U-shaped head 175 on the yoke 176. The yoke 176 is mounted to swing on the rod 16 on which the lower ends of the sectors 1 are mounted to slide. The rod 16 extends beyond the right-hand side plate of the machine for the reception of the yoke 176. The yoke 176 has an arm which supports the head 175 with its lugs 174 and 177, a rearwardly directed arm 178, and a downwardly directed arm 176a. The arm 178 of the yoke 176 which extends to the rear is forked at its rear end, as best seen in Fig. 13, and has two lugs 179 and 180 which, as the yoke 176 swings about the rod 16, are alternately arrested by an abutment rod 181 screwed into the intermediate plate of the machine. The arm 178 has a longitudinal slot 182 through which projects a rivet 183 in the left-hand arm 184 of a frame 185 for controlling the totalizer shutter G, the printing of the symbols by the arcuate member 273, Fig. 25, and for determining the species of calculation. This frame 185 is mounted to swing about the abutment rod 181. The right-hand arm 186 of the frame 185 bears a rivet 187 to which is attached one end of a spring 188 whose other end is secured to a pin 189 near the rear end of the arm 178 of the yoke 176. The spring 188 turns the yoke 176 clockwise about the rod 16 until the upper lug 179 of its arm 178 is arrested by the abutment rod 181, this being the normal position of the yoke 176.

Owing to the connection 182, 183, this also determines the normal position of the frame 185.

Riveted into the left-hand arm 184 of the frame 185 is a pin 190, Fig. 15, on which are pivoted two links 191 and 192. The link 191 at the right has a hole 193 in its lower end by which it is mounted on a rivet pin 194 at the front end of an arm 195 whose rear end is fulcrumed about a rivet 196 in the sub-total slide, or manual controlling member 198, which, as described with reference to Fig. 25, is pivotally connected at 117a to the bellcrank 117 to which is riveted the key bar 197, 118 of the subtotal key 13. The link 192 at the left is similarly connected to an arm 199 fulcrumed about a rivet 199a, Fig. 25 in the total slide, or manual controlling member 201 which is, in the manner described, operatively connected to the bellcrank 117 to which the bar 200, 118 of the total taking key 13 is riveted. The rear ends of the two slides or manual controlling members 198 and 201, are longitudinally slotted at their rear ends, at 202 and 203, respectively, and are mounted to slide on a rod 202a. In the initial position projections 204 and 205 at the rear ends of the respective arms 195 and 199 can cooperate with the finger 171 of the T member 160 upon shifting in the direction of the arrow "206." The arm 195 is guided by the right-hand side of the downwardly directed arm 176a when the arm 195 is turned clockwise.

7. The operation of the totalizer control mechanism

For a better understanding of this operation the control and the rocking of the totalizer 4 will now be briefly described for total and subtotal taking if there is a positive value in the totalizer 4. By way of example, when the total taking key 13 in Fig. 25 is depressed, the total slide 201 is shifted in the direction of the arrow "206" in Fig. 15, and the projection 205 of the arm 199, acting on the finger 171 of the T member 160, swings the member anti-clockwise about its pivot 159 so that its front lug 161 engages below the lug 163 of the rocker 165, as shown in Fig. 14. When the drive of the machine rotates the driving shaft 10 through 90 degrees in the direction of the arrow "11," the cam plate 169 on the shaft 10 immediately acts on the roller 168 and turns the rocker 165 anti-clockwise. The lug 163 of the rocker 165 engages the lug 161 of the T member 160 and pulls this down. Through the rivet pin 159 in the bellcrank arm 158, the totalizer controlling bellcrank 148 and through the arm 147 with its fork 150 and the stay 151, the totalizer 4 is rocked into subtraction position, arrow "Sub 7," The holder 155 is turned clockwise or in the direction of the arrow "Sub 7" by the stay 151 while the holder 154 is retained by the rivet 157, and so tension is exerted on the spring 156. The total in the totalizer 4 is now cancelled by the corresponding cancelling sector 138 and a cancelling gear 248, as will be more fully described with reference to Fig. 22, and the cancelled value is printed by the sectors 1.

When the driving shaft 10 is returned in the direction against the arrow "11" and the total taking key 13 has been positively unlocked, as described, all members of the mechanism are returned into their initial positions by the holder spring 156 and the rocker spring 170. This is shown in Fig. 12 and it will appear that in this position the roller 168 is on a depressed portion of the cam plate 169 and the lug 164 of the rocker 165 is below the rear lug 162 of the T member 160.

In contradistinction to this, in the calculation of minus values under zero and subsequent total taking, the value indicated in complementary form in the totalizer 4 must be withdrawn from the totalizer 4 by additive operation through a cancelling mechanism, in order to print this complementary value as a positive one. This is effected as follows:

In the calculation of minus values the subtraction key 13 is depressed, which key, by means of a projection—not shown—corresponding to the projections 204 and 205, Fig. 15, on the corresponding slide, so controls the T member 160 that its front lug 161 is below the lug 163 of the rocker 165. When the machine is started the totalizer 4 is rocked into subtraction position, arrow "Sub 7," by the cam plate 169, the roller 168 on the rocker 165, the rocker itself, its lug 163, the front lug 161 of the T member 160, and the forked upper end 150 of the totalizer controlling bellcrank 148. When the totalizer controlling bellcrank 148 is turned in the direction "Sub 7," the coupling rod 144 through rivet pins 143 and 146, turns the fork 142 slightly clockwise, that is, in upward direction, about its bearing screw 141. If in the calculation of minus values the capacity of the totalizer 4 is exceeded in negative sense, the coupling frame 47 is turned into the position illustrated in Fig. 14 in the direction of the arrow "a" during the first cycle of the machine, in positive cooperation with the tens shifts from order to order. By the bearing screw 141 on the right-hand arm 125 of the coupling frame, the fork 142 is moved in the same direction until finally the prong 172 of the fork is below the lug 174 of the yoke 176. When the driving shaft 10 and the totaliser 4 return into their normal positions, the coupling rod 144 turns the fork 142 slightly in anti-clockwise direction about its bearing screw 141 and the prong 172 of the fork is again withdrawn out of reach of the lug 174 on the yoke 176. Since at this moment the lip 69 at the rear end of the locking slide 50 is engaged by the notch 67 in the catch 63, Fig. 2, and the lugs 57 and 58 engaged, the bar 60 which locks the operation keys 13 is active and locks the depressed subtraction key 13, the lugs 161 and 163 remain in cooperative position, Fig. 14.

During the subsequent second cycle, the driving shaft 10 is again partly turned in the direction of the arrow 11 for introducing the fugitive 1, and the totalizer 4 is returned into subtraction position through cam plate 169, rocker 165, T member 160, and totalizer controlling bellcrank 148. The coupling rod 144 returns the fork into the position illustrated in Fig. 14 in which its prong 172 is again in the path of the lug 174 of the yoke 176.

During the second cycle, the hook 137 of the canceling sector 138 which is moved in the direction of the arrow "2," engages the tooth 136 of the cancelling pawl 130 and turns this in the direction of the arrow "a," Fig. 11. Through its lug 129 and the lug 127 of the plate 126, the coupling frame 47 is also turned in the direction "a" and the fork 142 is turned in the direction of the arrow "b" in Fig. 14. The prong 172 of the fork acts on the lug 174 of the yoke 176 and turns the yoke 176 anti-clockwise against the action of the spring 188 which connects it to the frame 185, and the lug 179 on the rear arm 178 of the yoke 176 moves away from the abutment rod 181. The frame 185 partakes in the movement of the yoke 176 to which it is connected by the slot 182 and the pin 183. The frame 185 is turned clockwise about the abutment rod 181. These movements of the yoke 176 and the frame 185 raise the spring 188 by which they are connected. As soon as the spring 188 has moved beyond the center of the connection 182—183, this being its dead-center position, it acts on the yoke 176 in the opposite direction and turns the yoke anti-clockwise until the lower lug 180 on its rear arm 178 strikes the abutment rod 181, as shown in Fig. 16. The fork 142 during this operation turns the yoke 176 only slightly, that is beyond the dead center position of the spring 188 whereupon the pull of the spring 188 moves the yoke 176 and the frame 185 fully into the position shown in Fig. 16. The turning of the frame 185 in upward direction raises the links 191 and 192, Fig. 15, through the rivet pin 190, whereby the arms 195 and 199 to which the links 191 and 192 are pivotally connected on the total and subtotal slides 198 and 201, respectively, are swung clockwise about their fulcrum points 196 and 199a.

When the driving shaft 10 returns, the T member 160 is first turned slightly in anti-clockwise direction by links and levers, not shown. The front lug 161 of the T member slides off the lug 163 of the rocker 165 after which the spring 156 of the holders 154 and 155 which has been tensioned as described, returns the totalizer 4 and its totalizer controlling bellcrank 148 into their initial positions. The T member 160 is also raised and its front lug 161 slides along the rear face of the lug 163 on the rocker 165, but does not leave the lug 163. A short time before the driving shaft 10 and its driving means return into their initial positions, the elevated portion of the cam plate 169 releases the roller 168 of the rocker 165, whereupon the rocker 165 and the T member 160 return into their initial positions according to Fig. 18 by spring action. At the same time, as described in section 3 "The operation of the locking means for the keys 12 and 13," the notch 68 of the catch 63 releases the lip 69 at the rear end of the locking slide 50, Fig. 3, and its spring 53 turns the coupling frame 47 back into its intial position as shown in Fig. 1, and, through the bearing screw 141 in the right-hand arm 125 of the coupling frame 47, the fork 142 and the coupling rod 144 return into their initial positions, while the yoke 176, the frame 185, and the links 191 and 192 with the arms 195 and 199, remain in the positions shown in Fig. 18, that is, are prepared for total or subtotal taking in the additive direction.

When, after the calculation of more minus values the total or subtotal key 13 is depressed for total or subtotal taking, the projection 204 or 205 of the arm 195 or 199, as the case may be, slides past below the finger 171 of the T member 160 and this is not influenced. In consequence, the normal operative connection of the lug 162 at the rear of the T member 160 and the lug 164 of the rocker 165 is conserved, as shown in Fig. 18. The rocker 165 is now turned anti-clockwise by the means described and raises the T member 160 which operates the totalizer controlling bellcrank 148. This, in turn, moves the totalizer 4 into additive position in the direction of the arrow "5 Add." Total taking is now effected as will be described in section 10, "The cancelling of a value above zero in the totalizer by total or subtotal taking," whereupon the number wheels 42 of the totalizer 4 which, as mentioned, has eleven orders, indicate the value "999 999 999 99."

The yoke 176, the frame 185, the links 191 and 192, and the arms 195 and 199, are returned into their initial positions, upon the subsequent calculation of positive values by again exceeding the capacity of the totalizer 4 in the positive direction, as follows:

If, after minus values have been calculated, one or more values are calculated additively, and if the zero position is exceeded in the totalizer 4, the coupling frame 47 is moved in the direction of the arrow "a" into the position in Fig. 19 by the pin 44 on the extra or fugitive one tens-shift member 31 and the end 45 of the arm 46 at the left-hand side of the coupling frame 47 incident to the tens shift from order to order, while the corresponding number wheel 42 passes from "9" to "0." The fork 142 which is moved in the direction of the arrow "b," and has been turned slightly in anti-clockwise direction by the coupling rod 144 about the bearing pin 141 during the preceding turning of the totalizer 4 into its additive position in the direction of the arrow "Add 5," engages the rear surface of the lug 177 on the yoke 176 with its lower prong 173. When the driving shaft 10 is returned, the totalizer 4 is also positively returned into its initial position, and the coupling rod 144 moves the lower prong 173 out of engagement with the lug 177 on the yoke 176. A short time after the beginning of the second cycle of the driving shaft 10, the fork 142 is moved in the direction of the arrow "b" and its prong 173 is engaged again with the lug 177 on the yoke 176.

The cancelling sector 138 now moves the coupling frame 47 further in the direction of the arrow "a" and into the position in Fig. 11, through the hook 137 on the cancelling sector 138, the cancelling pawl 130, its lug 129 and the lug 127 on the plate 126. The fork 142 is moved in the direction of the arrow "b" and its prong 173, through the lug 177, turns the yoke 176 clockwise about the rod 16. Through the slot-and rivet connection 182, 183, the frame 185 turns anti-clockwise about the abutment rod 181. The spring 188 which connects the yoke 176 and the frame 185, now descends and when it has moved beyond its dead-center position it acts on the yoke 176 in clockwise direction again until the lug 179 of the rear arm 178 engages the abutment rod 181, as shown in Fig. 20. Through the rivet 190 in the frame 185 and the links 191, 192, Fig. 15, which now descend, the arms 195 and 199 of the total and subtotal slides (198, 201) are moved in the same direction, and the slides 198, 201 are returned into their initial positions in which the projections 204 and 205 of their respective arms are again in position to be operated by the finger 171 on the T member 160.

When the driving shaft 10 is now turned back against the arrow "11," the T member 160 is turned slightly in anti-clockwise direction so that its rear lug 162 slides off the lug 164 of the rocker 165, whereupon the spring 156 on the holders 154 and 155 returns the totalizer 4 and the totalizer controlling bellcrank 148 into the initial positions illustrated in Fig. 12. This causes the T member 160 to descend and the front side of its rear lug 162 to slide along the rear side of the lug 164 on the rocker 165. A short time before the driving shaft 10 returns into its initial position, the roller 168 of the rocker 165 is released by the elevated portion of the cam plate 169 and the rocker 165 is now free to swing back. This is followed by the T member 160, and the notch 68 in the catch 63 releases the lip 69 at the front end of the locking slide 50, as shown in Fig. 3, so that the coupling frame 47 and the members it actuates are free to return into their initial positions illustrated in Fig. 12.

8. The first shutter arrangement

As already explained, the calculated minus value is indicated as a complementary value by the number wheels 42 of the totalizer 4 if the capacity of the totalizer has been exceeded in the negative direction. This complementary value, however, easily causes errors, for the following reason.

If, by way of example, the totalizer 4 indicates the complementary value "999 996 583 67" and the operator is not aware that this is a complementary value, as when the operator interrupts the operation of the machine for a long period and, when resuming it, mistakes the said complementary value for the result of a calculation of several additions, that is, a positive value. To eliminate errors from this source, a shutter G, as best seen in Fig. 17, is operatively connected to the frame 185 for concealing the number wheels 42 of the totalizer 4 when they indicate a complementary value.

The lower end of a connecting link A is slotted longitudinally at B and placed on the rivet 183 by which the yoke 176 and the frame 185 are connected, as described. The lower end of the connecting link A is secured by a spring washer C. At its upper end the connecting link A is pivoted about a rivet D on the shorter arm of a bellcrank E on the totalizer trunnion 153 at the right-hand side of the totalizer controlling bellcrank 148 so that it can swing about the trunnion 153 but is held against axial displacement thereon. A flange F projects to the right from the upper end of the longer arm of the bellcrank E and to this is secured the right-hand end of the shutter G. The left-hand end of the shutter G is secured in similar manner to the upper end of an arm H which is mounted to swing on the left-hand totalizer trunnion 153a. A spring K whose rear end is attached to a pin L riveted into the longer arm of the bellcrank E and whose front end is anchored on a pin M secured in the right-hand side plate of the machine, pulls the inverted U frame E, G, H anti-clockwise about the trunnions 153 and 153a until the longer arm of the bellcrank E is arrested by the pin M, this being the initial position of the shutter G, as shown in Figs. 12, 14, 17 and 20, in which the shutter G unmasks the inspection opening N in the cover plate P so that the value indicated by the number wheels 42 of the totalizer 4—this being a positive value—can be read through the inspection opening N. In this normal position of the shutter G, the upper end of the slot B in the connecting link A contacts the rivet 183.

8a. The operation of the first shutter arrangement

When the capacity of the totalizer 4 is exceeded negatively, the frame 185, as described in section 7, is thrown into the position in Fig. 18 from its initial position in Fig. 12. In consequence of this movement of the frame 185 in clockwise direction the rivet 183 in the frame traverses an idle path in the slot B in the lower end of the connecting link A and then strikes the upper end of the slot B, raising the connecting link A and through rivet pin D, turning the frame E, G, K clockwise about the trunnions 153 and 153a against the action of the spring K. In this position of the frame E, G, H, the shutter G is below the inspection opening N in the cover plate P so that the operator cannot read the complementary value which the number wheels 42 display after the capacity of the totalizer has been exceeded negatively. At the same time, he is warned that he has negatively exceeded the capacity of the totalizer 4, that is, that there is a negative balance whose amount he can print by total or sub-total taking.

Preferably the outer surface of the shutter G is of a color strikingly different from that of the top plate P.

8b. The second shutter arrangement

Referring now to Fig. 26, the shutter G is a U-shaped member with lugs at both ends, and screws 302 secure the lugs to the arm H at the left and to a bellcrank 300 at the right. At its lower end, the bellcrank 300 has a hook 301 which engages over the rivet 183 already referred to. The bellcrank 300 corresponds to the bellcrank E and performs at the same time the function of the connecting link A pivoted to the shorter arm of this bellcrank E at D. As described, the rivet 183 operatively connects the yoke 176 and the frame 185. When the capacity is understepped, and the frame 185 is turned clockwise, the bellcrank 300 is positively turned clockwise about the right-hand trunnion 153 and moves the shutter G so that it conceals the number wheels 42 of the totalizer 4. Connecting the shutter G to the arm H and the bellcrank 300 by the screws 302 facilitates assembling as compared with the flanges H of the first shutter arrangement. In addition, the rivet 183 and the bellcrank 300 are connected positively and without slack so that the spring K of the first arrangement can be dispensed with.

8c. The third shutter arrangement

If the operator desires to calculate further minus values after the capacity has been understepped and if he desires to inspect the complementary value on the number wheels 42 of the totalizer 4 which is concealed by the shutter G when the capacity is understepped, the shutter G is fulcrumed on the bellcrank 300 and the arm H and is equipped with a handle 306 for withdrawing it to expose the number wheels 42 with the complementary value, as will now be described with reference to Figs. 27 to 29.

The shutter G is U-shaped as in Fig. 26 but instead of being held by the screws 302, this shutter is fulcrumed about screws 303 on the bellcrank 300 and the arm H. A spring 304 by which the shutter G is connected to the bellcrank 300, holds the rear edge at the right of the shutter G against an abutment 305 on the bellcrank 300. This is the normal position of the shutter G, as shown in Fig. 27 and when the bellcrank 300 is turned clockwise by the rivet 183 the shutter G is below the inspection opening N, Fig. 28. A handle 306 is secured on the shutter G and projects through a slot 307 in the cover plate P. If the operator in case he calculates further minus values, desires to inspect the complementary value on the number wheels 42 of the totalizer 4, he exposes the inspection opening N by pulling the handle 306 to the front, as shown in Fig.

29. The spring 304 moves with the shutter G and when it has passed across its dead center position turns the shutter G anti-clockwise until the handle 306 bears against the front edge of the slot 307 and the shutter G remains in the position Fig. 29 in which the number wheels 42 of the totalizer 4 can be observed through the opening N in the cover plate P. To return the shutter G into its initial position, Fig. 27, from the position in Fig. 29 if the negative value is succeeded by a higher positive value, the bellcrank 300 is turned anti-clockwise. As the handle 306 is retained by the front edge of the slot 307 the shutter G turns clockwise and when the spring 304 has moved beyond its dead center it again moves the shutter into contact with the abutment 305 and the parts are now again in the position Fig. 27 in which the shutter G exposes the inspection opening N in the cover plate P, and the newly calculated positive value.

9. *The cancelling mechanism*

When a total or subtotal is taken an amount which has been indicated as a positive one in the totalizer 4, is withdrawn from the totalizer 4 by cancelling the totalizer 4 by turning back its number wheels 42 to "0", and the value is printed. In order to be able to also print in positive form a value which has been indicated by the totalizer 4 as a complementary one when total and subtotal taking, the number wheels 42 of the totalizer 4 must be cancelled by turning in the opposite direction, i. e., to "9." For this purpose, two cancelling mechanisms are provided, as will now be described.

As mentioned, and best seen in Figs. 21 and 22, the driving gears 8 of the totalizer 4 are mounted on a shaft 207. The shaft 207, as shown at the center of Fig. 22, has a semi-cylindrical groove 208 in which is inserted a rotary resetting bar 209. The resetting bar 209 is shown, broken away, at the left in Fig. 22. A tooth 211 projects inwardly from the hub 210 of each driving gear 8 and engages in a space 213 defined by a pair of flanges 212 on the shaft 207. The gears 8 are so positioned on the flanges 212 that the ends 214 of their hubs 210 extend through half the width of each flange. In this manner, all gears 8 are mounted side by side on the flanges 212 with their teeth 211 engaging in the spaces 213 between the flanges.

Similarly, the driving gears 6 of the totalizer 4 are arranged on their shaft 215, with a groove 216 in the shaft, and a rotary resetting bar 217 in the groove 216. Teeth 218 projecting from the hub of each gear 6 extend into spaces 220 between flanges 219 of the shaft 215 on which the hubs of the gears 6 are mounted in the same manner as the hubs of the gears 8 are on the flanges 212 of their shaft 207. The shafts 207 and 215 are so arranged with respect to each other that their grooves 208 and 216 are pitched at an angle of 36 degrees as shown in Figs. 24 and 25. The teeth 211 and 218 in the hubs of the respective gears 8 and 6, however, are in the same angular position for both shafts 207 and 215.

The rotary resetting bar 209 and 217 are flattened at 221 and 222, respectively, and are so positioned in their normal or initial positions that their flat surfaces 221 and 222 allow the teeth 211 and 218 of the corresponding gears 8 and 6 to move freely. The left-hand end 235, ends 236 of the respective resetting bar 209 and 217 are fully cylindrical heads. Grooves 223 and 224 are made in the resetting bar 209 and 217 between the heads 235 and 236 and the flat faces 221 and 222, preferably at 36 degrees to the adjacent face, one end of each groove 223 and 224 forming a tooth 225 and 226, respectively, which teeth in the normal positions of the wedges 209 and 217 engage in slots 227 and 228 in the perimeters of holes 230 and 231 in the left-hand end plate 229 of the totalizer 4. At their right-hand ends, the resetting bar 209 and 217 are again set off in parallel relation to their grooves 223 and 224. In this manner, the resetting bar 209 and 217, together with their shafts 207 and 215, can rotate in holes 232 and 233 in the intermediate plate 234 which is positioned at the right-hand side of the number wheels 42 without jamming as the resetting bar 209 and 217 rotate with their shafts 207 and 215.

The heads 235 and 236 of the resetting bar 209 and 217 are cylinders, as mentioned, and project beyond the left-hand side plate 229 of the totalizer 4. Their free ends are notched at 239 and 240, respectively and the left-hand end of a coiled spring 237 is inserted in the notch 239, a second coiled spring 238 being arranged similarly with respect to the notch 240. The right-hand ends of the springs 237 and 238 engage, respectively, in holes 241 and 242 in the left-hand ends of the shafts 207 and 215. The reaction of the springs 237 and 238 holds the teeth 225 and 226 securely in their slots 227 and 228 in the left-hand side plate 229 of the totalizer 4 in the initial positions of the resetting bar 209 and 217.

The resetting bars 209 and 217 are held against axial displacement by the inner surface 245 of a locking plate 243 which has a pair of eyes at its ends and is U-shaped. The eyes are placed on the left-hand ends of the stays 151 and 151a, the inner surface 245 of the locking plate being held against the ends of the heads 235 and 236 of the resetting bars 209 and 217 with some play, thus preventing axial displacement of the resetting bars 209 and 217 and holding the ends of the springs 237 and 238 in the notches 239 and 240 of the heads 235 and 236.

The right-hand end of the shaft 207 extends beyond the intermediate plate 234 and is mounted to rotate in a hole 247 in the right-hand side plate 152 of the totalizer 4. A canceling pinion 248 is keyed on this end of the shaft between the intermediate plate 234 and the right-hand side plate 152 by a key 249 projecting inwardly from the left-hand end of its hub and engaging in the groove 208 in the shaft 207. In a similar manner, the other shaft 215 is extended beyond the intermediate plate 234 and its right-hand end is mounted to rotate in a hole 247a in the right-hand side plate 152, and a second canceling pinion 251 is placed on this shaft and keyed thereon by a key 249a engaging in the groove 216 in the shaft 215. When the total or sub-total key is operated, sector 138 is shifted upwardly on rod 17 in the direction of arrow 253 by conventional mechanism that is the same as embodied in the "Mercedes" ten-key adding machine. Briefly, this mechanism comprises an arm 420 (Fig. 26) pivoted at 421 to a lever 422 pivoted on a rod 423 fixed in the machine frame. A flange 424 formed on arm 420 lies behind shoulders 425 formed on the sub-total and total slides 198 and 201, respectively. The upper end of lever 422 has a pin and cam slot connection 426 with a lever 427 pivoted on a rod 428 fixed in the machine frame. The left end of lever 427 carries a pin 429 that extends into a slot 430 in the sector 138. A spring 431 connected to arm 420 normally tensions lever 422 clockwise about pivot 423; and through the pin and slot connection 426, tensions the lever 427 counterclockwise about rod 428. Thus, sector 138 is withheld from engagement with pinions 248 and 251. When, however, either the sub-total or total key is depressed, its corresponding slide 198 or 201 is moved rearwardly causing its shoulder 425 to engage flange 424 and thrust arm 420 to the right. This moves lever 422 counterclockwise, which movement cams lever 427 clockwise against the tension of spring 431 and causes pin 429 to elevate the sector 138 upwardly on rod 17 a distance sufficient to bring the sector into a position where it may be engaged by either pinion 248 or 251. The concelling sector 138 whose upper end only is shown in Fig. 22, is made with a rack on its upper edge and a rack 252 is secured to the right-hand side of the cancelling sector 138 at the side of its own rack. When the totalizer 4 is in additive position, the pinion 251, and when it is in subtractive position, the pinion 248, meshes with the racks on the cancelling sector 138. It is understood that the cancelling sector 138 may be a single member, that is, may be made without the rack 252.

Levers 256 and 261 are mounted to swing on the shaft 257 which supports the intermediate wheels 8a in the totalizer 4, with their U-shaped hubs embracing each other, as best seen in Fig. 21, partly in dotted lines and viewed from the left. A finger 255 on the lever 256 is arranged to engage in a depression 254 in the perimeter of the hub of the subtraction pinion 248 on the shaft 207. The longer arm 258 of the lever 256 is connected to a spring 259 secured to the shorter arm 260 of the lever 261. The pull of the spring 259 forces the finger 255 of the lever 256 into the depresion 254, and the end of the longer arm 262 of the lever 261 into a depression 263 in the hub of the addition pinion 251. This holds the two pinions and their shafts 207 and 215 against unintentional rotation while at the same time the springs 237 and 238, acting clockwise, hold the resetting bars 209 and 217 in their normal positions, with their teeth 225 and 226 engaging in the notches 227 and 229, respectively, in the left-hand side plate 229 of the totalizer 4.

*10. The cancelling, by total or subtotal taking, of a value above zero in the totalizer*

Upon depression, for instance, of the total taking key 13, as described in section 7, the totalizer 4 is rocked into subtraction position in the direction of the arrow "7 Sub," moving the driving gears 8 of the totalizer 4 into mesh with the racks 3 on the sectors 1. At the same time, the cancelling sector 138 is shifted by a mechanism not shown in the direction of the arrow "253" and into mesh with the subtraction pinion 248.

By the operation of the machine the movable rod 17 is shifted transversely in the direction of the arrow "2" and through the slot 139, moves the cancelling sector 138 positively in the same direction and the subtraction pinion 248 is rotated in the direction of the arrow "c." The finger 255 of the lever 256 is pushed out of the recess 254 in the hub of the pinion against the spring 259. The subtraction pinion 248 turns the shaft 207 in the same direction "c" by its wedge or key 249. The rotary resetting bar 209 partakes in the rotation of the shaft 207 in whose groove 208 it is placed. The tooth 225 is forced out of the slot 227 in the left-hand end plate 229 of the totalizer 4 and the rotary resetting bar 209 is turned anticlockwise in the groove 208 of the shaft 207. The edge 209a where the flat surface 221 intersects the perimeter of the resetting bar 209, now projects into the path of the teeth 211 of the driving gears 8 which move in the space 213 between the flanges 212. This is shown in Fig. 23. If during the preceding calculation a denominational train of whels 8, 8a, 8b, 42 of a calculating order in the totalizer 4 has remained in zero position the edge 209a of the rotary resetting bar 209 clears the end 211a of the tooth 211 in the corresponding driving gear 8.

The subtraction pinion 248 which is driven by the cancelling sector 138, the shaft 207 and the rotary resetting bar 209 which are driven positively by the pinion 248, perform only one complete revolution in the direction of the arrow "c" while the cancelling sector 138 performs a complete stroke. During the complete revolution the edge 209a of the rotary resetting bar 209 engages the teeth 211 of the driving gears 8 which are positioned at various points in the spaces 213 between the flanges 212 in conformity with the status of the several trains of gears in the totalizer 4 and returns these into their initial positions in sequence or at the same time. The driving gears 8 which are at "9" are engaged first and the driving gears 8 which have been rotated to represent units of less value are engaged later. Overthrowing of the driving gears 8 beyond their positions is prevented by their wider tens-shift cams 40 striking the cams 38 on the tens-shift members 31 after the zero position has been reached, which members at this moment are locked against shifting by a bail 432, Fig. 26. Bail 432 is pivoted on rod 423. A spring 435, connected to a lower arm formed on the bail, normally tensions the bail so that a central portion 433 thereof bears against a flange 434 formed on lever 422. In this position, the central portion 433 lies out of the path of movement of shoulders 436 formed on each of the tens-shift members. When lever 422 is rocked counterclockwise on rod 423, incident to depression of either the total or sub-total key, as previously described, flange 434 rocks bail 432 counterclockwise placing the central portion 433 immediately behind shoulders 436 to lock the tens-shift members 31 against movement during total or subtotal taking operations.

As the driving wheels 8 mesh with the racks 3 on the sectors 1, rotation of the gears 8 during the said cancelling operation causes a shifting of the sectors 1 in the direction of the arrow "2" in conformity with the value of the total, whereby, when the cancelling operation has been completed, those types 9 that have been moved into active position are printed on the paper carried by the platen 312 by the printing mechanism of the machine.

When all trains of gears in the totalizer 4 have been returned into the position corresponding to the position "0" of the number wheels 42, the single complete revolution of the subtraction pinion 248, its shaft 207 and its rotary resetting bar 209 has been completed, and the tooth 225 of the rotary resetting bar 209 is again opposite the slot 227 into which it is shifted by the spring 237, this being the initial position of the resetting bar 209. The flat surface 221 of the resetting bar 209 is now again out of the path of the teeth 211. The spring 259 returns the finger 255 of the lever 256 into the recess 254 in the hub of the subtraction pinion 248, holding the pinion 248 its shaft 207, and its rotary resetting bar 209 against unintentional rotation.

The transfer of the total value to the paper on the platen 312 of the machine is completed by the types 9 and the printing mechanism when the driving shaft 10 has completed its partial rotation through 90 degrees in the direction of the arrow "11." At the same time, the cancelling sector 138 is moved against the arrow "253" in Fig. 22, and unmeshed from the subtraction pinion 248. At the beginning of the subsequent return movement of the driving shaft 10 against the arrow "11" the totalizer 4 is returned into its normal position. At the same time, the cancelling sector 138 and the sectors 1 are returned into their initial positions in the direction against the arrow "2" by the restoring rod 17.

In contradistinction, when the subtotal key 13 is depressed, the totalizer 4 is held in its swung-out position for the duration of a to and fro partial rotation of the driving shaft 10 so that the sectors 1 which are returned as the driving shaft 10 is reversely rotated against the arrow "11," introduce the total value into the totalizer 4 again.

11. The cancelling, by total or subtotal taking, of a value below zero in the totalizer If a value below zero is in the totalizer 4, the trains of gears at all calculating orders in the totalizer 4 have been turned to "9" or beyond, viz. from "9" to "8," "7," etc. at the moment at which the capacity of the totalizer is exceeded in the negative direction. Thereby, the teeth 218 of the driving gears 6 of the trains of gears that have remained in "9" position also move into the position illustrated in Fig. 24.

When, for instance, the total taking key 13 is depressed, the totalizer 4 is rocked into adding position in the direction of the arrow "5 Add." This is due to the fact that upon exceeding the capacity in negative direction the mechanism has been reversed to the position shown in Fig. 18 and consequently the arm 199 by which the state of the totalizer 4 is determined, has been moved into inactive position with respect to the finger 171 on the T member 160. The cancelling sector 138 is now shifted so that its rack 252 meshes with the addition pinion 251 on the shaft 215. The machine now shifts the cancelling sector 138 in the direction of the arrow "2" and the cancelling sector 138 then rotates the pinion 251, its shaft 215 and its rotary resetting bar 217 through a complete revolution in the direction of the arrow "c" and the arm 262 of the lever 261 (Fig. 21) is moved out of the recess 263 in the hub of the addition pinion 251. At the beginning of this rotary movement, the tooth 226 of the rotary resetting bar 217 is moved out of the notch 228 in the end plate 229 against the spring 238 and during the rotary movement, the edge 217a of the rotary resetting bar 217, which can rotate after the disengagement of the tooth from the notch 228, engages the teeth 218 of the driving gears 6 sooner or later depending upon their setting and turns all trains of gears in the totalizer 4 in the direction corresponding to the sequence of numerals as far as "9" whose tens-shift cams 41 at this moment engage the cams 39 of the tens-shift members 31. Those driving gears 6 that remain in the "9" position during the calculation, are obviously not influenced. At the end of a complete revolution of the addition pinion 251, the shaft 215 and its rotary resetting bar 217, the tooth 226 on the rotary wedge 217 returns into its initial position, as defined by the notch 228, under the action of the spring 238 and the arm 262 of the lever 261 reenters the recess 263 in the hub of the addition pinion 251. During the cancelling operation, the sectors 1 are shifted in the direction of the arrow "2" in Fig. 1 in conformity with the calculated values by the driving gears 6 in the totalizer 4 and the racks 3 on the sectors. Finally, the total is printed by the hammers 311.

By the aforesaid means of cancelling, the negative value which has been indicated by the number wheels 42 of the totalizer 4 in complementary form, is printed on the paper on the cylinder 312 in positive form.

In order that the imprint of a negative total value can be readily distinguished from a positive total value, symbols are printed when total and subtotal taking by the means that will be described in the following section.

12. The symbol printing means for total and subtotal taking

Referring now to Fig. 25, the front ends 265 and 266 of the state-determining arms 195 and 199 on the total slide 201 and on the subtotal slide 198 are arranged in stepped and staggered relation for cooperation with a offset portion 280 of the subtotal slide 198 and an edge 278 of the total slide 201. When, for instance, the total taking key 13, with its key bar 200, 118, is depressed and there is a positive value in the totalizer 4, the total slide 201 is moved to the rear, as indicated by the arrow "206." The front portions of the arms 195 and 199 are arched in upward direction and a bail 269 extends transversely through the arched portions above the slides 198 and 201. The bail 269 includes a pair of arms whose upper ends are mounted to swing about the rod 16, and a spring 268 tends to move the bail toward the front, that is, clockwise about the rod 16, until a notch 270 at the inner end of a notched arm which extends to the rear from the left-hand arm supporting the bail 269, engages a lug 271 on the arcuate member 273, defining the normal position of the bail 269. The arcuate member 273 is mounted to slide on the rod 16 with a lower slot 276, and on the rack-restoring rod 17 with an upper slot 377. A spring 275 is secured to the lower end of the arcuate member 273 and the upper end of the member supports types 272 for the six symbols 272a–f.

The slide 201, in moving to the rear in the direction of the arrow "206," strikes the front edge of the bail 269 with the rear edge of the front end 266 of its arm 199 and turns the bail 269 anti-clockwise about the rod 16. The notch 270 of the rearwardly extending arm clears the lug 271 and places another notch 274 in the arm in the path of the lug 271. For the present the arcuate member 273 cannot follow the pull of its spring 275 as the lower end of its slot 277 is arrested by the rod 17, but when the rod 17 is moved upwards on the operation of the machine, as indicated by the arrow "2," the spring 275 moves the member 273 in the same direction, until its lug 271 is arrested by the notch 274. In this position of the member 273, the clear sign 272a is printed. The member 273 is returned in to its initial position by the rod 17 descending against the arrow "2."

If there is a negative value in the totalizer 4, the arms 195 and 199 have been reversed, as shown in Fig. 18, at the moment the capacity of the totalizer was exceeded. When in this case the total is taken, the edge 278 of the total slide 201 turns the bail 269 slightly so that the notch 279 in its arm arrests the lug 271 of the member 273. In this position of the member 273 the symbol 272b is printed.

If there is a positive value in the totalizer 4 and if it is desired to take a subtotal, the end 265 of the arm 195 on the subtotal slide 198, upon depression of the subtotal key 13, with its key bar 197, 118, swings the bail 269 anti-clockwise so far that all notches in its arm clear the lug 271 and the arcuate member 273 is free to slide upwards for the full length of its lower slot 276, and the subtotal symbol 272c is printed.

If there is a negative value in the totalizer 4 and it is desired to take the subtotal, the offset 280 of the subtotal slide 198 swings the bail 269 so far that the notch 281 arrests the lug 271 of the member 273, and the symbol 272d is printed.

The symbols 272e and 272f are printed by means of steps 282 and 283 and a stop hook 316. Obviously, the bail 269 must be released in this case.

13. A calculation example

Assume that the amount "575" has been introduced in the totalizer 4 additively in the usual manner, and that "752" is to be subtracted from this.

After the calculation of the plus amount "575" the number wheels 42 of the eleven-order totalizer 4 display "000 000 005 75." The amount "752" is introduced in the usual manner by means of the number keys 12, whereby the first three setting wheels 310 of the setting wheel carriage which have been set to "7," "5," and "2" are moved into active position with respect to the sectors 1 at the hundreds, tens and units orders. The subtraction key 13 is depressed and its bellcrank 117, through the operating frame 107, Fig. 4, the connecting rod 106, the lever 93, the spring 97 and the unlocking slide 88, shifts the bar 60 and the pusher 59 into position for locking the number and operation keys 12 and 13. The subtraction key 13 is held in depressed position as the bar 60 engages in the notch 119 in the sector-shaped cam of the key. At the same time, depression of the subtraction key 13 breaks the normal operative connection of the rear lug 162 at the lower end of the T member 160 and the rocker lug 164, Fig. 12, by turning the T member 160 anti-clockwise, and the negative connection by lugs 161 and 163 is established. The bar 60 and the pusher 59, when moving into their active positions, positively close the contact in the motor circuit. The motor now turns the driving shaft 10 through 90 degrees in the direction of the arrow "11." At the beginning of this operation, the cam plate 169, through the T member 160, the bellcrank 148, and the stay 151 in the totalizer 4, moves the totalizer into subtraction position in the direction of the arrow "7 Sub," and the driving gears 8 in the totalizer 4 mesh with the racks 3 on the sectors 1. The setting wheels 310 on the setting wheel carriage that represent the amount "752" are returned into their zero positions, shifting the corresponding sectors 1 in the direction of the arrow "2." There is no obstruction to this shifting of the sectors 1, as at this time the restoring rod 17 is also actuated in the direction of the arrow "2" by the mechanism of the machine, and the cancelling sector 138 positively partakes in this movement of the rod 17. When the sectors 1 are shifted, the racks 3, through gears 8, 8a, 8b, reversely rotate in clockwise direction the number wheels 42 which indicate the value "575" at the units, tens and hundreds orders for "7," "5," and "2" steps, respectively. At the moment the hundreds number wheel 42 is turned from "0" to "9," the tens-shift cam 40 of the driving gear 8 at the hundreds order prepares a tens shift which is completed by the tens-shift actuating mechanism 400, the numeral "1" being transferred to the next higher order by the corresponding tens-shift member 31, the rivet 28 of the pawl 23, the notch 25 in the rack 3, and the rack and the numeral wheel of this order is turned from "0" to "9" and the described tens-transfer operations are repeated, to set all number wheels 42 at the left of the hundreds order to "9." As the number wheel 42 of the highest order rotates from "0" to "9," the tens-shift cam 40 of the corresponding driving gear 8 sets position that tens-shift member 31 which is arranged at the left-hand side of the sector 1 at the highest order, that is, the fugitive one tens-shift member. This tens-shift member is moved into the position illustrated in Fig. 2 by the rotation of wheel 403. Through the pin 44 on the coupling frame 47, the bolt 49, and the locking slide 50, the lip 69 on the slide 50 is engaged by the notch 67 in the catch 63, and the lugs 57 and 58 on the slide 50 and the pusher 59 engage. Due to the rocking of the coupling frame 47 in the direction of the arrow "a," the cancelling pawl 130 is placed in cooperative position with respect to the tooth 137 of the cancelling sector 138, as shown in Fig. 10, and the prong 172 of the fork 142 is presented to the lug 174 of the yoke 176.

The hammer mechanism 311 of the machine causes the printing of "752" on the paper on the platen 312, and the setting wheel carriage is returned into its normal position. A minus sign is automatically printed behind the printed value to show that it is a subtracted item, by the type 272f on the member 273.

When the value "752" and its minus symbol 272f have been printed, the driving shaft 10 has completed its partial rotation through 90 degrees in the direction of the arrow "11." The driving shaft 10 is now returned against the arrow "11" and initially the T member 160 is turned slightly in anti-clockwise direction. This breaks the connection of the lugs 161 and 163 and the spring 156 of the holders 154, 155, returns the totalizer 4 into its initial or non-calculating position, Fig. 12. The restoring rod 17 returns the sectors 1, the cancelling sector 138, and the arcuate symbol printing member 273 into their initial positions. A short time before the driving shaft 10 has returned into its initial position, the lug 100 of the cam plate 101 tends to release the key locking means, the bar 60 and the pusher 59. This would be effected by the lever 93, the unlocking slide 88, the arm 84 and the spring 82, but, owing to the yielding connection of the arm 84 and the bar 60 formed by the spring 82, the locking of the keys by the bar 60 and the pusher 59 is maintained by the interengaging lugs 57 and 58, and the contact in the motor circuit remains closed so that the first cycle is automatically followed by the second one, after the driving shaft 10 has completed its return movement.

At the close of the first cycle of the driving shaft 10 the number of wheels 42 of the totalizer show the complementary value "999 999 998 23." The fugitive 1 which is still to be subtracted in the units order, is introduced during the second cycle. At the beginning of the second cycle, the totalizer 4 is rocked into subtraction position, Fig. 14, because the subtraction key remains in its depressed position. When the cancelling sector 138 which is positively moved in the direction of the arrow "2," has shifted through four fifths of its total stroke its tooth 137 engages the cancelling pawl 130 which, through plate 126, end 123 of arm 124 and pin 122, rocks the coupling frame 47 into the position illustrated in Fig. 11, the rack 3 being operated by the pawl 23 through rivet 28 and slot 25 in the rack. This turns the denominational train of gear wheels at the units order in the totalizer 4 through one unit subtractively. The units order displays "2" and the totalizer 4 displays "999 999 998 22." At the same time, the fork 142 which, being pivoted on the screw 141, partakes in the movement of the coupling frame 47, engages the lug 174 on the yoke 176 and rocks the reversing means, viz. the yoke 176 and the frame 185, into the position illustrated in Fig. 16, and the links 191 and 192, Fig. 15, reverse the arms 195 and 199 on the slides 188 and 201 by which arms the state of the totalizer 4 and the printing of symbols when total or subtotal taking are determined. The rivet 183 on the frame 185 through the connecting link a, moves the shutter G into the position shown in Fig. 18 in which it is below the inspection opening N in the cover plate P. At the same time, through the bolt 49 on the coupling frame 47, the lip 69 at the end of the locking slide 50 is released by the notch 67 in the catch 63 and engaged by the notch 68, and the lugs 57 and 58 are moved apart, as shown in Fig. 3. The driving shaft 10 now completes its partial rotation through 90 degrees in the direction of the arrow "11" and "00—" is printed on the paper, as normally the two noughts are printed for all cycles of the machine without value calculation, and the minus sign is printed because the subtraction key has been locked in its depressed position. This indicates to the operator that the capacity of the totalizer 4 has been exceeded negatively.

The driving shaft 10 now starts on its return against the arrow "11". The lugs 161 on the T member 160 and 163 on the rocker 165 are disengaged and the totalizer 4 returns into its normal position, Fig. 18. The number wheels 42 of the totalizer 4 which now display the complementary "999 999 998 22" are concealed from the operator by the shutter G. The restoring rod 17 descends and returns the arcuate symbol printing member 273 into its initial position, Fig. 25. When the driving shaft 10 has completed its return movement, the key-locking bar 60 and the pusher 59 are returned into their released positions, as shown in Fig. 1, by the cooperation of the lug 100 on the plate 101, the end 98 of the lever 93, the unlocking slide 88, the arm 84, the spring 82 and the bracket 80. The subtraction key 13 is now free to return into its normal position and the motor contact is opened. The machine is now ready for the next operation.

If now, by way of example, a value "257" is calculated additively, the capacity of the totalizer 4 is again exceeded in positive direction. In this case, the motor has been started by depressing the addition key 13, and during the first cycle of the machine all number wheels 42 at the left of the number wheel 42 of the hundreds order are rotated to "0" as the hundreds number wheel 42 is turned from "9" to "0" as the consequence of continuous tens shifting. The lip 69 of the locking slide 50 is engaged by the notch 67 in the catch 63 and the key locking means 59 and 60 are held by the lugs 57 and 58. At the end of the operation, the totalizer 4 displays "000 000 000 79." During the second cycle, the fugitive 1 is added on the number wheel 42 of the lowest calculating order and the arms 195 and 199 are returned into their normal positions through the reversing means, viz. the fork 142, its prong 173, the lug 177 on the yoke 176, the frame 185, and the links 191 and 192, Fig. 20. At the same time, the rivet 183 and the connecting link A return the shutter G into its normal position, Fig. 12, in which it exposes the inspection opening N in the cover plate P. At the end of the second cycle, the totalizer 4 displays the true value "000 000 000 80."

Having now particularly described and ascertained the nature of our said invention, and in what manner the same is to be performed, I declare that what I claim is:

1. In a machine of the class described having an adding and subtracting totalizer including tens-transfer members, amount entering and operation controlling keys, means for locking the keys, a cycle initiating member operable by a portion of the key locking means, additional tens-transfer members associated with the highest and lowest denominational orders, a member for driving the additional tens-transfer associated with the lowest denominational order, means controlled by the additional highest order tens-transfer member and cooperating with the drive member and the additional lowest order tens-transfer member to enter a fugitive "1" upon the totalizer, a locking member intermediate the controlling means and the key locking means, said locking member being operable by the controlling means to retain the key locking means and cycle initiating member in effective position for controlling the entering of the fugitive "1" when the highest order tens-transfer member is actuated incident to the positive or negative overdrafting of the totalizer.

2. In a machine of the class described having an adding and subtracting totalizer including tens-transfer members, amount entering and operation controlling keys, means for locking the keys, a cycle initiating member operable by a portion of said locking means, additional tens-transfer members associated with the highest and lowest denominational orders of the totalizer for entering a fugitive "1" upon the totalizer, a member driven during each cycle of the machine, and means connecting the additional tens-shift members and movable by the highest order member incident to overdrafting of the totalizer during a cycle to a position where the lowest order tens-shift member is connected with the drive member for operation by the latter during the next cycle to enter a fugitive "1," said control means being also effective during the first-mentioned cycle to lock the key locking and cycle initiating member in effective position to insure the effecting of the said next cycle.

3. In a calculating machine, the combination with a register, including two intergeared series of denominational wheels; means to enter amounts thereon; and means to reverse the direction of rotation of said wheels; of a plurality of canceling shafts related to the wheels, each shaft having a resetting member, said members pitched at an angle of 36 degrees relatively to each other; a canceling pinion for each shaft, the pinions being relatively offset; and driving mechanism to co-act to with one or the other of the canceling pinions.

AUGUST FRIEDRICH POTT.